United States Patent
Shiraishi

(10) Patent No.: US 7,609,430 B2
(45) Date of Patent: Oct. 27, 2009

(54) OPTICAL BEAM SCANNING DEVICE RESTRAINING BEAM POSITION ERROR DUE TO TEMPERATURE CHANGE WITH DIFFRACTION GRATING AND IMAGE FORMING APPARATUS USING THE SAME

(75) Inventor: Takashi Shiraishi, Kanagawa-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 11/773,494

(22) Filed: Jul. 5, 2007

(65) Prior Publication Data
US 2009/0009843 A1 Jan. 8, 2009

(51) Int. Cl.
G02B 26/08 (2006.01)

(52) U.S. Cl. .................... 359/204.5; 359/206.1

(58) Field of Classification Search ............. None
See application file for complete search history.

(56) References Cited

U.S. PATENT DOCUMENTS

| 6,452,709 B1 * | 9/2002 | Shiraishi et al. ............. 359/205 |
| 6,493,126 B1 * | 12/2002 | Iizuka ........................ 359/205 |
| 2004/0141218 A1 * | 7/2004 | Suzuki et al. ............... 359/196 |

FOREIGN PATENT DOCUMENTS

| JP | 2005-221870 | 8/2005 |
| JP | 2006-154701 | 6/2006 |
| JP | 2007293182 A * | 11/2007 |

* cited by examiner

Primary Examiner—Stephone B Allen
Assistant Examiner—Jennifer L. Doak
(74) Attorney, Agent, or Firm—Turocy & Watson, LLP

(57) ABSTRACT

To provide a technique that can appropriately correct an optical characteristic according to fluctuation in an environmental temperature. An optical beam scanning device that shapes a diverging ray from a light source to be a light beam having a predetermined sectional shape in a pre-deflection optical system 7 including plural optical elements and deflects the light beam shaped by the pre-deflection optical system 7 with a polygon mirror 80 to cause the light beam to scan in a main scanning direction, wherein the pre-deflection optical system 7 has optical elements 79 arranged between the light source and reflecting surfaces of the polygon mirror 80 in a light beam traveling direction and having negative power and, among the plural optical elements forming the pre-deflection optical system 7, in at least one optical element in which a principal ray of the light beam from the light source is made incident on an position of incidence different from an optical path of an optical axis of the pre-deflection optical system 7 in a sub-scanning direction orthogonal to the main scanning direction, a diffraction grating is formed on at least one of a plane of incidence and a plane of exit of the light beam in the optical element.

5 Claims, 37 Drawing Sheets

FIG.11

$$x = \frac{cuy \times y^2 + cuz \times z^2}{1+\sqrt{1-ay \times cuy^2 \times y^2 - az \times cuz^2 \times z^2}} + \sum a_{lm} \times y^l \times z^m$$

LENS SURFACE SHAPE DEFINITION FORMULA

FIG.12

DIAMETER OF POLYGON MIRROR INSCRIBED CIRCLE    40.0

POSITION OF POLYGON MIRROR ROTATION CENTER    X 17.2    Y 10.1
(POSITION VIEWED FROM LOCAL COORDINATE SYSTEM OF POLYGON REFLECTING SURFACE)

FINITE LENS FOCUSING POSITION:    RAY1 503.7    RAY2 479.9    RAY3 482.6    RAY4 504.7

| | SURFACE No. | CURVATURE MAIN SCANNING cuy | CURVATURE SUB-SCANNING cuz | TH COMMON | TH RAY1 | TH RAY2 | TH RAY3 | TH RAY4 | INDEX OF REFRACTION N | REMARKS |
|---|---|---|---|---|---|---|---|---|---|---|
| PRE-DEFLECTION OPTICAL SYSTEM | 1 | 0 | | 5.0 | | | | | 1.514 | |
| | 2 | | 0.0183 | | | | | | | |
| | 3 | | | | -25.0 | -28.9 | -28.3 | -24.9 | | |
| | 4 | | | 67.9 | | | | | | |
| | 5 | | | 10.0 | | | | | 1.514 | |
| | 6 | | | 0.5 | | | | | | |
| | 7 | 0.00449 | 0.02217 | 3.0 | | | | | 1.507 | PLASTIC LENS. CURVED-SURFACE POLYNOMIAL COEFFICIENT:TABLE1 |
| | 8 | 0.00653 | 0.03494 | 38.7 | | | | | 1.507 | PLASTIC LENS. CURVED-SURFACE POLYNOMIAL COEFFICIENT:TABLE2 |
| | 9 | | | 2.0 | | | | | 1.514 | |
| | 10 | | | 11.1 | | | | | | |
| | | | | DEFLECTION SURFACE | | | | | | |
| POST-DEFLECTION OPTICAL SYSTEM | 11 | | | -6.8 | | | | | | |
| | 12 | | | -2.0 | | | | | -1.514 | |
| | 13 | | | -25.3 | | | | | | |
| | 14 | 0.01917 | -0.0698 | -5.6 | | | | | -1.507 | PLASTIC LENS. CURVED-SURFACE POLYNOMIAL COEFFICIENT:TABLE3 |
| | 15 | 0.02308 | 0.0113 | -129.7 | | | | | -1.507 | PLASTIC LENS. CURVED-SURFACE POLYNOMIAL COEFFICIENT:TABLE4 |
| | 16 | 0.00098 | -0.0128 | -5.9 | | | | | -1.507 | PLASTIC LENS. CURVED-SURFACE POLYNOMIAL COEFFICIENT:TABLE5 |
| | 17 | 0.00246 | 0.01158 | -131.5 | | | | | -1.507 | PLASTIC LENS. CURVED-SURFACE POLYNOMIAL COEFFICIENT:TABLE6 |
| | 18 | | | -2.0 | | | | | -1.514 | |
| | 19 | | | | -0.1 | 0.0 | 0.0 | -0.1 | | |
| | 20 | | | -83.0 | | | | | | |

GLASS(BK7): 1.514
PLASTIC LENS: 1.507

INDEX OF REFRACTION AFTER REFLECTION, INTER-SURFACE DISTANCE, AND SHAPE DATA ARE REPRESENTED BY VALUES WITH - SIGN
LENS SURFACE SHAPE WITH CURVED-SURFACE POLYNOMIAL COEFFICIENT DATA IS INDICATED BY THE FOLLOWING EXPRESSION $$x = (cuy \cdot y^2 + cuz \cdot z^2)/(1 + Sqrt(1 - ay \cdot cuy^2 \cdot y^2 - az \cdot cuz^2 \cdot z^2)) + \Sigma a_{lm} \cdot y^l \cdot z^m$$

IN EXAMPLE OF THIS TIME, $ay=1, az=1$

Y DIRECTION: MAIN SCANNING DIRECTION, Z DIRECTION: SUB-SCANNING DIRECTION, X DIRECTION: OPTICAL AXIS DIRECTION
(+ SIDE IN RESPECTIVE LOCAL COORDINATE SYSTEMS OF PRE-DEFLECTION OPTICAL SYSTEM, - SIDE IN RESPECTIVE LOCAL COORDINATE SYSTEMS OF POST-DEFLECTION OPTICAL SYSTEM

FIG.13

PARAXIAL POWER OF OPTICAL ELEMENT 79

| | CURVATURE OF PARAXIAL SECTION | | EACH SURFACE POWER | | EQUIVALENT INTERVAL | PARAXIAL SECTION POWER AS LENS | $\phi/\nu$ |
|---|---|---|---|---|---|---|---|
| | PLANE OF INCIDENCE | PLANE OF EXIT | PLANE OF INCIDENCE | PLANE OF EXIT | | | |
| MAIN SCANNING | 4.015E-03 | 6.870E-03 | 2.03E-03 | -3.48E-03 | 1.99096 | -0.001433121 | -8.43891E-06 |
| SUB-SCANNING | 1.776E-02 | 3.915E-02 | 9.00E-03 | -1.98E-02 | 1.99096 | -0.010481462 | -6.17199E-05 |

| DIFFRACTIVE SURFACE POWER | | | $\phi/\nu$ | $\Sigma\phi/\nu$ |
|---|---|---|---|---|
| | PLANE OF INCIDENCE | PLANE OF EXIT | | |
| MAIN SCANNING | — | -5.67E-07 | 4.67222E-09 | -8.43424E-06 |
| SUB-SCANNING | — | -3.93E-07 | 3.2377E-09 | -6.17167E-05 |

FIG.14

ECCENTRICITY AND INCLINATION DATA OF RESPECTIVE LOCAL COORDINATE SYSTEMS

| | | SURFACE No | ECCENTRICITY | | | | | | | TILT ANGLE | | | | |
|---|---|---|---|---|---|---|---|---|---|---|---|---|---|---|
| | | | y DIRECTION | | z DIRECTION | | | | AROUND z AXIS | AROUND y AXIS | | | | |
| | | | COMMON | COMMON | RAY1 | RAY2 | RAY3 | RAY4 | COMMON | RAY1 | RAY2 | RAY3 | RAY4 |
| PRE-DEFLECTION OPTICAL SYSTEM | | 1 | | | 9.7 | 1.2 | -3.5 | -9.7 | | -0.0707 | -0.0067 | 0.0234 | 0.0707 |
| | | 2 | | | | | | | | | | | |
| | | 3 | | | | | | | | | | | |
| | | 4 | | | | | | | | | | | |
| | | 5 | | | | | | | | | | | |
| | | 6 | | 0.0 | | | | | | | | | |
| | | 7 | | 0.0 | | | | | | | | | |
| | | 8 | | | | | | | | | | | |
| | | 9 | | | | | | | -1.0197 | | | | |
| | | 10 | -1.4 | | | | | | 1.0197 | | | | |
| POST-DEFLECTION OPTICAL SYSTEM | | 11 | | | | | DEFLECTION SURFACE | | -1.0197 | | | | |
| | | 12 | | | | | | | | | | | |
| | | 13 | | | | | | | | | | | |
| | | 14 | | | | | | | | | | | |
| | | 15 | | | | | | | | | | | |
| | | 16 | | | | | | | | | | | |
| | | 17 | | | | | | | | | | | |
| | | 18 | | | | | | | | -0.4222 | -0.0444 | 0.1509 | 0.4206 |
| | | 19 | | | | | | | | 0.4222 | 0.0444 | -0.1509 | -0.4206 |
| | | 20 | | | | | | | | | | | |

FIG.15

COEFFICIENT TABLE 1 COEFFICIENT VALUE OF $a_{lm}$

COEFFICIENT TABLE 2 COEFFICIENT VALUE OF $a_{lm}$

COEFFICIENT TABLE 3 COEFFICIENT VALUE OF $a_{lm}$

COEFFICIENT TABLE 4 COEFFICIENT VALUE OF $a_{lm}$

COEFFICIENT TABLE 5 COEFFICIENT VALUE OF $a_{lm}$

COEFFICIENT TABLE 6 COEFFICIENT VALUE OF $a_{lm}$

FIG.16

COEFFICIENT VALUE OF OPTICAL PATH DIFFERENCE FUNCTION $C_{lm}$

| m \ l | 1 | 2 | 3 | 4 |
|---|---|---|---|---|
| 0 | 0 | 0 | 0 | 2.71E-07 |
| 2 | 0.0003 | 0.000433 | 0 | -3.3E-08 |
| 4 | 5.26E-06 | -1.2E-06 | 0 | 7.92E-09 |
| 6 | 1.81E-08 | -5.7E-08 | 0 | 1.57E-10 |

(bottom row additional value): -4.8E-09

FIG.18

AMOUNT OF CHANGE AT THE TIME OF
TEMPERATURE RISE OF 15 DEGREES

| | BEAM POSITION IN SUB-SCANNING DIRECTION | DEFOCUS IN MAIN SCANNING DIRECTION | DEFOCUS IN SUB-SCANNING DIRECTION | BEAM POSITION IN SUB-SCANNING DIRECTION (LBO) | $\alpha_H \times LBO \times t$ | AMOUNT OF CHANGE IN RAY4 REFERENCE BEAM INTERVAL |
|---|---|---|---|---|---|---|
| ray1 | 0.018 | 0.1 | 0.2 | 8.3 | 0.003 | 0.035 |
| ray2 | 0.001 | 0.0 | 0.2 | 1.8 | 0.001 | 0.018 |
| ray3 | -0.005 | 0.1 | 0.2 | -4.2 | -0.001 | 0.013 |
| ray4 | -0.017 | 0.1 | 0.2 | -8.4 | -0.003 | 0.000 |

AMOUNT OF MOVEMENT IN SUB-SCANNING DIRECTION OF RAY1 − AMOUNT OF MOVEMENT IN SUB-SCANNING DIRECTION OF RAY4 : 0.035

FIG.19

DIAMETER OF POLYGON MIRROR INSCRIBED CIRCLE  40.0

|  | X | Y |
|---|---|---|
| POSITION OF POLYGON MIRROR ROTATION CENTER (POSITION VIEWED FROM LOCAL COORDINATE SYSTEM OF POLYGON REFLECTING SURFACE) | 17.2 | 10.1 |

|  | RAY1 | RAY2 | RAY3 | RAY4 |
|---|---|---|---|---|
| FINITE LENS FOCUSING POSITION | 1062.8 | 996.9 | 1014.0 | 1063.1 |

| | SURFACE No. | CURVATURE | | | TH | | | | | INDEX OF REFRACTION N | REMARKS |
|---|---|---|---|---|---|---|---|---|---|---|---|
| | | MAIN SCANNING cuy | SUB-SCANNING cuz | COMMON | COMMON | RAY1 | RAY2 | RAY3 | RAY4 | | |
| PRE-DEFLECTION OPTICAL SYSTEM | 1 | | | 5.0 | | 33.3 | 33.3 | 33.3 | 33.3 | | |
| | 2 | 0 | 0.0183 | | | -11.3 | -13.9 | -13.5 | -11.4 | 1.514 | |
| | 3 | | | 67.9 | | | | | | | |
| | 4 | | | 10.0 | | | | | | | |
| | 5 | | | 0.5 | | | | | | 1.514 | |
| | 6 | 0.00118 | 0.00775 | 3.0 | | | | | | 1.507 | PLASTIC LENS. CURVED-SURFACE POLYNOMIAL COEFFICIENT:TABLE1 |
| | 7 | 0.00295 | 0.02979 | 31.0 | | | | | | | PLASTIC LENS. CURVED-SURFACE POLYNOMIAL COEFFICIENT:TABLE2 |
| | 8 | | | 2.0 | | | | | | 1.514 | |
| | 9 | | | 11.1 | | | | | | | |
| | 10 | | | | | | DEFLECTION SURFACE | | | | |
| POST-DEFLECTION OPTICAL SYSTEM | 11 | | | -6.8 | | | | | | | |
| | 12 | | | -2.0 | | | | | | | |
| | 13 | | | -25.3 | | | | | | -1.514 | |
| | 14 | 0.01917 | -0.0698 | -5.6 | | | | | | -1.507 | PLASTIC LENS. CURVED-SURFACE POLYNOMIAL COEFFICIENT:TABLE3 |
| | 15 | 0.02308 | 0.0113 | -129.7 | | | | | | | PLASTIC LENS. CURVED-SURFACE POLYNOMIAL COEFFICIENT:TABLE4 |
| | 16 | 0.00098 | -0.0128 | -5.9 | | | | | | -1.507 | PLASTIC LENS. CURVED-SURFACE POLYNOMIAL COEFFICIENT:TABLE5 |
| | 17 | 0.00246 | 0.01158 | -131.5 | | | | | | | PLASTIC LENS. CURVED-SURFACE POLYNOMIAL COEFFICIENT:TABLE6 |
| | 18 | | | -2.0 | | | | | | -1.514 | |
| | 19 | | | | | 0.0 | 0.0 | 0.1 | 0.0 | | |
| | 20 | | | -83.0 | | | | | | | |

GLASS(BK7):1.514
PLASTIC LENS:1.507

INDEX OF REFRACTION AFTER REFLECTION, INTER-SURFACE DISTANCE, AND SHAPE DATA ARE REPRESENTED BY VALUES WITH − SIGN
LENS SURFACE SHAPE WITH CURVED-SURFACE POLYNOMIAL COEFFICIENT DATA IS INDICATED BY THE FOLLOWING EXPRESSION $x = (cuy*y^2 + cuz*z^2)/(1+\sqrt{1-ay*cuy^2*y^2-az*cuz^2*z^2}) + \Sigma\, a_{lm}*y^l*z^m$ IN EXAMPLE OF THIS TIME, ay=1, az=1

Y DIRECTION: MAIN SCANNING DIRECTION, Z DIRECTION: SUB-SCANNING DIRECTION, X DIRECTION: OPTICAL AXIS DIRECTION
(+ SIDE IN RESPECTIVE LOCAL COORDINATE SYSTEMS OF PRE-DEFLECTION OPTICAL SYSTEM, − SIDE IN RESPECTIVE LOCAL COORDINATE SYSTEMS OF POST-DEFLECTION OPTICAL SYSTEM

FIG.20

PARAXIAL POWER OF OPTICAL ELEMENT 79

| | CURVATURE OF PARAXIAL SECTION | | EACH SURFACE POWER | | EQUIVALENT INTERVAL | PARAXIAL SECTION POWER AS LENS | $\phi/\nu$ |
|---|---|---|---|---|---|---|---|
| | PLANE OF INCIDENCE | PLANE OF EXIT | PLANE OF INCIDENCE | PLANE OF EXIT | | | |
| MAIN SCANNING | 7.305E-04 | 2.433E-03 | 3.70E-04 | -1.23E-03 | 1.99096 | -0.000861679 | -1.52461E-07 |
| SUB-SCANNING | 5.542E-03 | 3.039E-02 | 2.81E-03 | -1.54E-02 | 1.99096 | -0.012508064 | -2.21311E-06 |

| | DIFFRACTIVE SURFACE POWER | | $\phi/\nu$ | $\Sigma\phi/\nu$ |
|---|---|---|---|---|
| | PLANE OF INCIDENCE | PLANE OF EXIT | | |
| MAIN SCANNING | -2.68E-06 | — | 2.20829E-08 | -1.30378E-07 |
| SUB-SCANNING | 2.50E-06 | — | -2.05826E-08 | -2.23369E-06 |

FIG.21

ECCENTRICITY AND INCLINATION DATA OF RESPECTIVE LOCAL COORDINATE SYSTEMS

| | | SURFACE No | ECCENTRICITY | | | | | | | TILT ANGLE | | | | |
|---|---|---|---|---|---|---|---|---|---|---|---|---|---|---|
| | | | y DIRECTION | z DIRECTION | | | | | AROUND z AXIS | AROUND y AXIS | | | | |
| | | | COMMON | COMMON | RAY1 | RAY2 | RAY3 | RAY4 | COMMON | RAY1 | RAY2 | RAY3 | RAY4 |
| PRE-DEFLECTION OPTICAL SYSTEM | | 1 | | | 9.0 | 1.7 | -2.7 | -9.1 | | -0.0644 | -0.0132 | 0.0151 | 0.0644 |
| | | 2 | | | | | | | | | | | |
| | | 3 | | | | | | | | | | | |
| | | 4 | | | | | | | | | | | |
| | | 5 | | | | | | | | | | | |
| | | 6 | | 0.1 | | | | | | | | | |
| | | 7 | | -0.1 | | | | | | | | | |
| | | 8 | | | | | | | | | | | |
| | | 9 | | | | | | | -1.0197 | | | | |
| | | 10 | -1.4 | | | | | | 1.0197 | | | | |
| POST-DEFLECTION OPTICAL SYSTEM | | 11 | | | | | | | -1.0197 | | | | |
| | | 12 | | | | | | | DEFLECTION SURFACE | | | | |
| | | 13 | | | | | | | | | | | |
| | | 14 | | | | | | | | | | | |
| | | 15 | | | | | | | | | | | |
| | | 16 | | | | | | | | | | | |
| | | 17 | | | | | | | | | | | |
| | | 18 | | | | | | | | -0.3684 | -0.1787 | -0.0826 | 0.3449 |
| | | 19 | | | | | | | | 0.3684 | 0.1787 | 0.0826 | -0.3449 |
| | | 20 | | | | | | | | | | | |

FIG.22

COEFFICIENT TABLE 1   COEFFICIENT VALUE OF $a_{lm}$

| m\l | 0 | 1 | 2 | 3 | 4 | 5 | 6 | 7 | 8 | 9 |
|---|---|---|---|---|---|---|---|---|---|---|
| 0 | 0 | 0 | -0.00022 | 0 | 1.2E-05 | 0 | -2.1E-08 | 0 | 0 | 0 |
| 2 | -0.0011 | 0 | 1.09E-05 | 0 | -7.3E-09 | 0 | -3.2E-10 | 0 | 0 | 0 |
| 4 | -4.4E-06 | 0 | -1.5E-08 | 0 | 7.60E-10 | 0 | 4.22E-11 | 0 | 0 | 0 |
| 6 | -2.2E-08 | 0 | 4.01E-11 | 0 | 3.13E-11 | 0 | -1.5E-13 | 0 | 0 | 0 |
| 8 | 0 | 0 | 0 | 0 | 0 | 0 | 0 | 0 | 0 | 0 |
| 10 | 0 | 0 | 0 | 0 | 0 | 0 | 0 | 0 | 0 | 0 |
| 12 | 0 | 0 | 0 | 0 | 0 | 0 | 0 | 0 | 0 | 0 |
| 14 | 0 | 0 | 0 | 0 | 0 | 0 | 0 | 0 | 0 | 0 |

COEFFICIENT TABLE 2   COEFFICIENT VALUE OF $a_{lm}$

| m\l | 0 | 1 | 2 | 3 | 4 | 5 | 6 | 7 | 8 | 9 |
|---|---|---|---|---|---|---|---|---|---|---|
| 0 | 0 | 0 | -0.00026 | 0 | 1.41E-05 | 0 | -3E-09 | 0 | 0 | 0 |
| 2 | 0.000299 | 0 | 9.59E-07 | 0 | 2.92E-08 | 0 | 1.58E-09 | 0 | 0 | 0 |
| 4 | -5.6E-06 | 0 | 2.94E-08 | 0 | -2.6E-10 | 0 | -3.7E-11 | 0 | 0 | 0 |
| 6 | 2.96E-08 | 0 | 1.75E-10 | 0 | -3.1E-11 | 0 | 5.83E-13 | 0 | 0 | 0 |
| 8 | 0 | 0 | 0 | 0 | 0 | 0 | 0 | 0 | 0 | 0 |
| 10 | 0 | 0 | 0 | 0 | 0 | 0 | 0 | 0 | 0 | 0 |
| 12 | 0 | 0 | 0 | 0 | 0 | 0 | 0 | 0 | 0 | 0 |
| 14 | 0 | 0 | 0 | 0 | 0 | 0 | 0 | 0 | 0 | 0 |

COEFFICIENT TABLE 3   COEFFICIENT VALUE OF $a_{lm}$

| m\l | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | 0.00645 | 0.000722 | -5E-06 | -2.8E-06 | 1.3E-10 | 5.85E-08 | 7.6E-12 | -7.8E-12 | -1E-14 | 2.75E-15 | 0 | 0 |
| 2 | 0.016347 | 8.55E-05 | -1.5E-05 | 1.74E-07 | -1.5E-08 | -2.3E-10 | 2.76E-12 | 3.23E-13 | -6.9E-14 | -2.3E-16 | 7.59E-17 | 0 | 0 |
| 4 | 0.000288 | -1.9E-07 | -2.4E-07 | -6.1E-08 | -1.6E-09 | 2.52E-11 | 9.46E-12 | -1.3E-14 | -1.5E-15 | -5E-17 | -1.1E-17 | 0 | 0 |
| 6 | -4.2E-06 | -2.9E-08 | 3.71E-08 | 3.55E-10 | -5.5E-11 | -1.1E-12 | -3.5E-13 | -4.3E-15 | 6.15E-16 | 9.46E-18 | -4.6E-19 | 0 | 0 |
| 8 | 3.71E-09 | 4.67E-10 | -7.8E-10 | -4.5E-12 | 3.79E-12 | -1.2E-14 | -4.6E-15 | 1.45E-16 | -3.2E-18 | -2E-19 | 6.55E-21 | 0 | 0 |
| 10 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |

COEFFICIENT TABLE 4   COEFFICIENT VALUE OF $a_{lm}$

| m\l | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | 0.005489 | 0.001004 | -4.6E-06 | -2.3E-06 | -2.2E-08 | 2.98E-09 | 5.38E-12 | -2.4E-12 | -4.5E-15 | -5.8E-16 | 0 | 0 |
| 2 | -0.00277 | 8.87E-05 | -4.8E-06 | 1.25E-07 | -8.5E-09 | -5.4E-11 | 1.77E-11 | 4.32E-14 | -8.2E-14 | 8.43E-17 | 5.8E-17 | 0 | 0 |
| 4 | 0.000233 | -3.8E-07 | -1.8E-08 | -5.1E-09 | -2E-09 | 2.67E-11 | 3.91E-13 | -3.6E-14 | 1.11E-14 | -2.6E-17 | -1.5E-17 | 0 | 0 |
| 6 | -6.3E-06 | 8E-09 | 2.19E-08 | 2.4E-10 | 6.03E-11 | -1.2E-12 | -3.4E-13 | -4E-16 | 2.19E-16 | 3.45E-18 | 5.23E-20 | 0 | 0 |
| 8 | 5.24E-08 | -2.6E-10 | -5.6E-10 | 3.06E-12 | 2.05E-12 | -2.5E-14 | -2.3E-15 | 9.25E-17 | 9.32E-19 | -9.6E-20 | 1.48E-22 | 0 | 0 |
| 10 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |

COEFFICIENT TABLE 5   COEFFICIENT VALUE OF $a_{lm}$

| m\l | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | -0.00538 | 1.44E-05 | 4.46E-07 | -1E-07 | 3.35E-11 | 1.34E-11 | 2.82E-15 | -8.2E-16 | 1.7E-19 | -2.6E-21 | -4.1E-24 | 4.44E-25 |
| 2 | 0.001464 | -4.9E-06 | 4.02E-07 | -3.4E-10 | 6.72E-11 | -1.3E-13 | -1.1E-14 | -1.5E-18 | -1.1E-18 | 5.93E-23 | 2.97E-23 | 1.35E-26 | 3.51E-28 |
| 4 | 4.83E-06 | -3.8E-09 | -1.4E-10 | -2E-12 | 3.63E-14 | -6.5E-17 | 1.72E-17 | -9.6E-21 | 4.26E-22 | 6.72E-24 | -4.9E-26 | -2.9E-28 | -5.7E-30 |
| 6 | 3.43E-09 | 1.98E-10 | -2.5E-12 | 1.27E-15 | -5E-16 | -8.7E-20 | 9.2E-20 | 2.07E-23 | 2.25E-23 | -5.6E-27 | 1.12E-27 | 5.88E-30 | -1E-31 |
| 8 | 6.8E-11 | -1.5E-13 | -4.3E-15 | -1.8E-16 | -6.5E-18 | -2.8E-21 | -2.3E-22 | 1.78E-24 | 7.66E-26 | 9.03E-29 | -2.4E-30 | -3.8E-33 | -5.9E-34 |
| 10 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |
| 22 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 |

COEFFICIENT TABLE 6   COEFFICIENT VALUE OF $a_{lm}$

| m\l | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 0 | -0.00753 | -0.00082 | 8E-07 | -5.7E-09 | 2.38E-11 | 2.29E-12 | 1.48E-15 | 3.23E-16 | 3.94E-19 | -6.4E-20 | -7.5E-24 | 1.53E-24 |
| 2 | -0.00196 | -4.9E-06 | 2.1E-07 | -2.3E-10 | 4.25E-11 | -1.2E-13 | -2.5E-15 | -1.9E-18 | -1.5E-18 | 1.69E-22 | -1.8E-25 | -2.2E-26 | 9.23E-28 |
| 4 | 3.37E-06 | -4.4E-09 | -2.8E-10 | -2.3E-12 | 7.36E-14 | 2.05E-16 | -5.2E-18 | -4.3E-20 | 2.17E-21 | 1.63E-24 | -4.2E-26 | 4.11E-28 | -5.4E-30 |
| 6 | 4.89E-09 | 1.91E-10 | -3.5E-12 | -3.1E-15 | 1.72E-16 | 3.34E-19 | -8.8E-21 | 1.67E-23 | 2.11E-23 | 1.7E-26 | 1.37E-27 | 2.68E-30 | -7.9E-32 |
| 8 | 5.61E-11 | -1.8E-13 | 7.99E-16 | -1.2E-16 | -8.2E-18 | -4.9E-21 | 3.17E-22 | -3E-25 | 2.01E-26 | 2.39E-28 | -2.5E-30 | 2.21E-33 | -3.2E-34 |
| 10 | 0 | 0 | 0 | 0 | 0 | 0 | 0 | 0 | 0 | 0 | 0 | 0 | 0 |
| 12 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 |
| 22 | 0 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 | 0 |

FIG.23

COEFFICIENT VALUE OF OPTICAL PATH DIFFERENCE FUNCTION

| m \ l | 0 | 1 | 2 | 3 | 4 |
|---|---|---|---|---|---|
| 0 | 0 | 0 | 0.002045 | 0 | 1.4E-06 |
| 2 | -0.00191 | 0 | 9.91E-07 | 0 | 1.41E-08 |
| 4 | -4.3E-06 | 0 | -1E-07 | 0 | 6.11E-09 |
| 6 | 5.57E-08 | 0 | -1.8E-09 | 0 | 8.6E-11 |

FIG.25

AMOUNT OF CHANGE AT THE TIME OF
TEMPERATURE RISE OF 15 DEGREES

| | BEAM POSITION IN SUB-SCANNING DIRECTION | DEFOCUS IN MAIN SCANNING DIRECTION | DEFOCUS IN SUB-SCANNING DIRECTION | BEAM POSITION IN SUB-SCANNING DIRECTION (LBO) | $\alpha_H \times LBO \times t$ | AMOUNT OF CHANGE IN RAY4 REFERENCE BEAM INTERVAL |
|---|---|---|---|---|---|---|
| ray1 | −0.013 | −0.1 | −0.5 | 8.3 | 0.003 | −0.025 |
| ray2 | −0.004 | −0.2 | −0.4 | 1.8 | 0.001 | −0.015 |
| ray3 | 0.006 | −0.2 | −0.4 | −4.1 | −0.001 | −0.005 |
| ray4 | 0.012 | −0.1 | −0.5 | −8.4 | −0.003 | 0.000 |

AMOUNT OF MOVEMENT IN SUB-SCANNING DIRECTION OF RAY1 − AMOUNT OF MOVEMENT IN SUB-SCANNING DIRECTION OF RAY4 : −0.025

FIG.26

DIAMETER OF POLYGON MIRROR INSCRIBED CIRCLE  40.0

POSITION OF POLYGON MIRROR ROTATION CENTER   Y 17.2   Z 10.1
(POSITION VIEWED FROM LOCAL COORDINATE SYSTEM OF POLYGON REFLECTING SURFACE)

| | | RAY1 | RAY2 | RAY3 | RAY4 |
|---|---|---|---|---|---|
| FINITE LENS FOCUSING POSITION | | 5518.7 | 4106.4 | 4336.0 | 5579.3 |

| | SURFACE No. | CURVATURE MAIN SCANNING cuy | CURVATURE SUB-SCANNING cuz | TH COMMON | TH RAY1 | TH RAY2 | TH RAY3 | TH RAY4 | INDEX OF REFRACTION N | REMARKS |
|---|---|---|---|---|---|---|---|---|---|---|
| PRE-DEFLECTION OPTICAL SYSTEM | 1 | | | 5.0 | 33.3 | 33.3 | 33.3 | 33.3 | | |
| | 2 | 0 | 0.0183 | | -0.2 | -3.1 | -2.6 | -0.1 | 1.514 | |
| | 3 | | | 67.9 | | | | | | |
| | 4 | | | 10.0 | | | | | 1.514 | |
| | 5 | | | 14.3 | | | | | | |
| | 6 | | | 2.0 | | | | | 1.514 | |
| | 7 | | | 11.1 | | | | | | |
| | 8 | | | | | | | | | |
| | 9 | | | 0.0 | | | | | DEFLECTION SURFACE | |
| | 10 | | | 0.0 | | | | | 0.000 | |
| POST-DEFLECTION OPTICAL SYSTEM | 11 | | | 0.0 | | | | | | |
| | 12 | 3.7E-08 | 0 | -73.2 | | | | | 0.000 | PLASTIC LENS. CURVED-SURFACE POLYNOMIAL COEFFICIENT:TABLE3 |
| | 13 | 5.2E-08 | 0 | 0.0 | | | | | 0.000 | PLASTIC LENS. CURVED-SURFACE POLYNOMIAL COEFFICIENT:TABLE4 |
| | 14 | 6.8E-11 | 0 | 0.0 | | | | | | PLASTIC LENS. CURVED-SURFACE POLYNOMIAL COEFFICIENT:TABLE5 |
| | 15 | 5.6E-11 | 0 | 0.0 | | | | | 0.000 | PLASTIC LENS. CURVED-SURFACE POLYNOMIAL COEFFICIENT:TABLE6 |
| | 16 | | | 0.0 | 0.0 | 0.0 | 0.0 | 0.0 | | |
| | 17 | | | -83.0 | | | | | | |
| | 18 | | | | | | | | | |

GLASS(BK7):1.514
PLASTIC LENS:1.507

INDEX OF REFRACTION AFTER REFLECTION, INTER-SURFACE DISTANCE, AND SHAPE DATA ARE REPRESENTED BY VALUES WITH - SIGN
LENS SURFACE SHAPE WITH CURVED-SURFACE POLYNOMIAL COEFFICIENT DATA IS INDICATED BY THE FOLLOWING EXPRESSION
$x = (cuy*y^2 + cuz*z^2)/(1+ \mathrm{Sqrt}(1 - ay*cuy^2*y^2 - az*cuz^2*z^2)) + \Sigma\, a_{lm}*y^l*z^m$ IN EXAMPLE OF THIS TIME, $ay=1, az=1$
Y DIRECTION: MAIN SCANNING DIRECTION, Z DIRECTION: SUB-SCANNING DIRECTION, X DIRECTION: OPTICAL AXIS DIRECTION
(+ SIDE IN RESPECTIVE LOCAL COORDINATE SYSTEMS OF PRE-DEFLECTION OPTICAL SYSTEM, - SIDE IN RESPECTIVE LOCAL COORDINATE SYSTEMS
OF POST-DEFLECTION OPTICAL SYSTEM

FIG.27

PARAXIAL POWER OF PLASTIC LENS BEFORE DEFLECTION

| | CURVATURE OF PARAXIAL SECTION | | EACH SURFACE POWER | | EQUIVALENT INTERVAL | PARAXIAL SECTION POWER AS LENS |
|---|---|---|---|---|---|---|
| | PLANE OF INCIDENCE | PLANE OF EXIT | PLANE OF INCIDENCE | PLANE OF EXIT | | |
| MAIN SCANNING | 0.000E+00 | 0.000E+00 | 0.00E+00 | 0.00E+00 | 0 | 0 |
| SUB-SCANNING | 0.000E+00 | 0.000E+00 | 0.00E+00 | 0.00E+00 | 0 | 0 |

FIG.28

ECCENTRICITY AND INCLINATION DATA OF RESPECTIVE LOCAL COORDINATE SYSTEMS

| SURFACE No | ECCENTRICITY | | | | | | | TILT ANGLE | | | | |
|---|---|---|---|---|---|---|---|---|---|---|---|---|
| | y DIRECTION | | z DIRECTION | | | | AROUND z AXIS | | AROUND y AXIS | | | |
| | COMMON | COMMON | RAY1 | RAY2 | RAY3 | RAY4 | COMMON | RAY1 | RAY2 | RAY3 | RAY4 | |
| 1 | | | 5.3 | 0.5 | -1.9 | -5.3 | | -0.0216 | 0.0009 | 0.0042 | 0.0216 | PRE-DEFLECTION OPTICAL SYSTEM |
| 2 | | | | | | | | | | | | |
| 3 | | | | | | | | | | | | |
| 4 | | | | | | | | | | | | |
| 5 | | | | | | | | | | | | |
| 6 | | | | | | | | | | | | |
| 7 | | 0.0 | | | | | | | | | | |
| 8 | | 0.0 | | | | | | | | | | |
| 9 | | | | | | | -1.0197 | | | | | |
| 10 | -1.4 | | | | | | 1.0197 | | | | | |
| 11 | | | | | | | DEFLECTION SURFACE | | | | | POST-DEFLECTION OPTICAL SYSTEM |
| 12 | | | | | | | 22.0000 | | | | | |
| 13 | | | | | | | | | | | | |
| 14 | | | | | | | | | | | | |
| 15 | | | | | | | | | | | | |
| 16 | | | | | | | | | | | | |
| 17 | | | | | | | | | | | | |
| 18 | | | | | | | | -1.5144 | | | | |
| 19 | | | | | | | | -1.0000 | 0.0000 | 0.0000 | 0.0000 | |
| 20 | | | | | | | | | 0.0000 | 0.0000 | 0.0000 | |

FIG.29

AMOUNT OF CHANGE AT THE TIME OF
TEMPERATURE RISE OF 15 DEGREES

|  | BEAM POSITION IN SUB-SCANNING DIRECTION | DEFOCUS IN MAIN SCANNING DIRECTION | DEFOCUS IN SUB-SCANNING DIRECTION | BEAM POSITION (LBO) | $\alpha_H \times LBO \times t$ | AMOUNT OF CHANGE IN RAY4 REFERENCE BEAM INTERVAL |
|---|---|---|---|---|---|---|
| ray1 | 0.045 | 0.7 | 1.9 | 7.4 | 0.002 | 0.090 |
| ray2 | 0.005 | 0.7 | 2.0 | 0.5 | 0.000 | 0.050 |
| ray3 | −0.017 | 0.7 | 2.0 | −5.1 | −0.002 | 0.028 |
| ray4 | −0.045 | 0.7 | 1.9 | −9.1 | −0.003 | 0.000 |

AMOUNT OF MOVEMENT IN
SUB-SCANNING DIRECTION OF RAY1 − AMOUNT OF MOVEMENT IN SUB-SCANNING DIRECTION OF RAY4 : 0.090

OPTICAL BEAM SCANNING DEVICE RESTRAINING BEAM POSITION ERROR DUE TO TEMPERATURE CHANGE WITH DIFFRACTION GRATING AND IMAGE FORMING APPARATUS USING THE SAME

BACKGROUND OF THE INVENTION

1. Field of the Invention

The present invention relates to an optical beam scanning device that causes a light beam from a light source to scan in a main scanning direction on photoconductive surfaces of photoconductive members, and, more particularly to a technique for realizing improvement of an optical characteristic.

2. Description of the Related Art

Conventionally, there is known a technique for, in optical beam scanning devices that shapes light beams from light sources to be a predetermined sectional shape and causes the light beams to scan in a predetermined direction, changing a beam interval in a direction for holding down a color drift caused in an image forming apparatus including the optical beam scanning device when a temperature change occurs by providing, in a pre-deflection optical system, a lens or a diffractive optical element having negative power that transmits light beams from plural light sources (JP-A-2005-221870).

There is also known an optical beam scanning device in which a resin lens, one surface of which is an anamorphic refractive surface and the other surface of which has a power diffractive surface of an elliptical shape, is arranged in front of a reflecting surface of a deflector and power of the power diffractive surface is set to reduce fluctuation in a position where a beam diameter in a main scanning direction and/or a sub-scanning direction converges (a beam waist position) to substantially zero (JP-A-2006-154701).

However, in the constitution described in JP-A-2005-221870, there is a range that the technique cannot cope with depending on a combination of materials of a housing of the optical beam scanning device, a frame that positions plural photoconductive members, and a shaft that drives an intermediate transfer belt for superimposing developed images on the plural photoconductive members and a temperature distribution.

In the constitution described in JP-A-2006-154701, since a beam passes an optical axis in the sub-scanning direction, it is impossible to change a sub-scanning direction optical path according to a temperature change and correct a color drift due to thermal expansion of an image forming apparatus.

SUMMARY OF THE INVENTION

It is an object of an embodiment of the present invention to provide a technique that is capable of appropriately correcting, in an optical beam scanning device, an optical characteristic according to fluctuation in an environmental temperature.

In order to solve the problem, an optical beam scanning device according to an aspect of the invention is an optical beam scanning device that shapes a diverging ray from a light source to be a light beam having a predetermined sectional shape in a pre-deflection optical system including plural optical elements and deflects the light beam shaped by the pre-deflection optical system with a rotating deflector to cause the light beam to scan in a main scanning direction, the optical beam scanning device characterized in that the pre-deflection optical system has optical elements arranged between the light source and reflecting surfaces of the rotating deflector in a light beam traveling direction and having negative power and, among the plural optical elements forming the pre-deflection optical system, in at least one optical element in which a principal ray of the light beam from the light source is made incident on an position of incidence different from an optical path of an optical axis of the pre-deflection optical system in a sub-scanning direction orthogonal to the main scanning direction, a diffraction grating is formed on at least one of a plane of incidence and a plane of exit of the light beam in the optical element.

An optical beam scanning device according to another aspect of the invention is an optical beam scanning device that shapes respective diverging rays from plural light sources to be light beams having a predetermined sectional shape in a pre-deflection optical system including plural optical elements and deflects the light beams shaped by the pre-deflection optical system with a rotating deflector to cause the light beams to scan in a main scanning direction, the optical beam scanning device characterized in that the pre-deflection optical system has optical elements arranged between the light source and reflecting surfaces of the rotating deflector in a light beam traveling direction and having negative power acting on all light beams and, among the plural optical elements forming the pre-deflection optical system, in at least one optical element in which principal rays of respective light beams from the plural light sources are made incident on positions of incidence different from each other in a sub-scanning direction orthogonal to the main scanning direction, a diffraction grating is formed on at least one of a plane of incidence and a plane of exit of the light beam in the optical element.

An image forming apparatus according to still another aspect of the invention is characterized by including the optical beam scanning device having the structure described above, a photoconductive member on which an electrostatic latent image is formed by a light beam caused to scan by the optical beam scanning device, and a developing unit that visualizes the electrostatic latent image formed on the photoconductive member.

DESCRIPTION OF THE DRAWINGS

FIG. 11 is a diagram showing an example of a shape definition formula for the lens surface;

FIG. 12 is an example of a data table that defines a lens surface of the optical element 79 and a diffraction grating formed on the lens surface;

FIG. 13 is an example of a data table that defines the lens surface of the optical element 79 and paraxial power of the diffraction grating formed on the lens surface;

FIG. 14 is an example of a data table that defines the lens surface of the optical element 79 and eccentricity and inclination of the diffraction grating formed on the lens surface;

FIG. 15 is an example of a data table that defines the lens surface of the optical element 79 and the diffraction grating formed on the lens surface;

FIG. 16 is an example of a data table that defines the lens surface of the optical element 79 and the diffraction grating formed on the lens surface;

FIG. 18 is a diagram showing changes in defocus amounts in the main scanning direction and the sub-scanning direction and intervals of sub-scanning direction beams due to temperature rise;

FIG. 19 an example of a data table that defines a lens surface of the optical element 79 and a diffraction grating formed on the lens surface;

FIG. 20 is an example of a data table that defines the lens surface of the optical element 79 and the paraxial power of the diffraction grating formed on the lens surface;

FIG. 21 is an example of a data table that defines the lens surface of the optical element 79 and the eccentricity and the inclination of the diffraction grating formed on the lens surface;

FIG. 22 is an example of a data table that defines the lens surface of the optical element 79 and the diffraction grating formed on the lens surface;

FIG. 23 is an example of a data table that defines the lens surface of the optical element 79 and the diffraction grating formed on the lens surface;

FIG. 25 is a diagram showing changes in defocus amounts in the main scanning direction and the sub-scanning direction and intervals of sub-scanning direction beams due to temperature rise;

FIG. 26 is an example of a data table that defines a lens surface of an optical element in an optical system in which the optical element 79 is not arranged in a pre-deflection optical system;

FIG. 27 is an example of a data table showing paraxial power of the lens surface of the optical element in the optical system in which the optical element 79 is not arranged in the pre-deflection optical system;

FIG. 28 is an example of a data table that defines eccentricity and inclination of the lens surface of the optical element in the optical system in which the optical element 79 is not arranged in the pre-deflection optical system;

FIG. 29 is a diagram showing changes in defocus amounts in the main scanning direction and the sub-scanning direction and intervals of sub-scanning direction beams due to temperature rise in the optical system in which the optical element 79 is not arranged in the pre-deflection optical system;

DESCRIPTION OF THE EMBODIMENTS

Embodiments of the present invention will be hereinafter explained with reference to the drawings.

Figure 1:
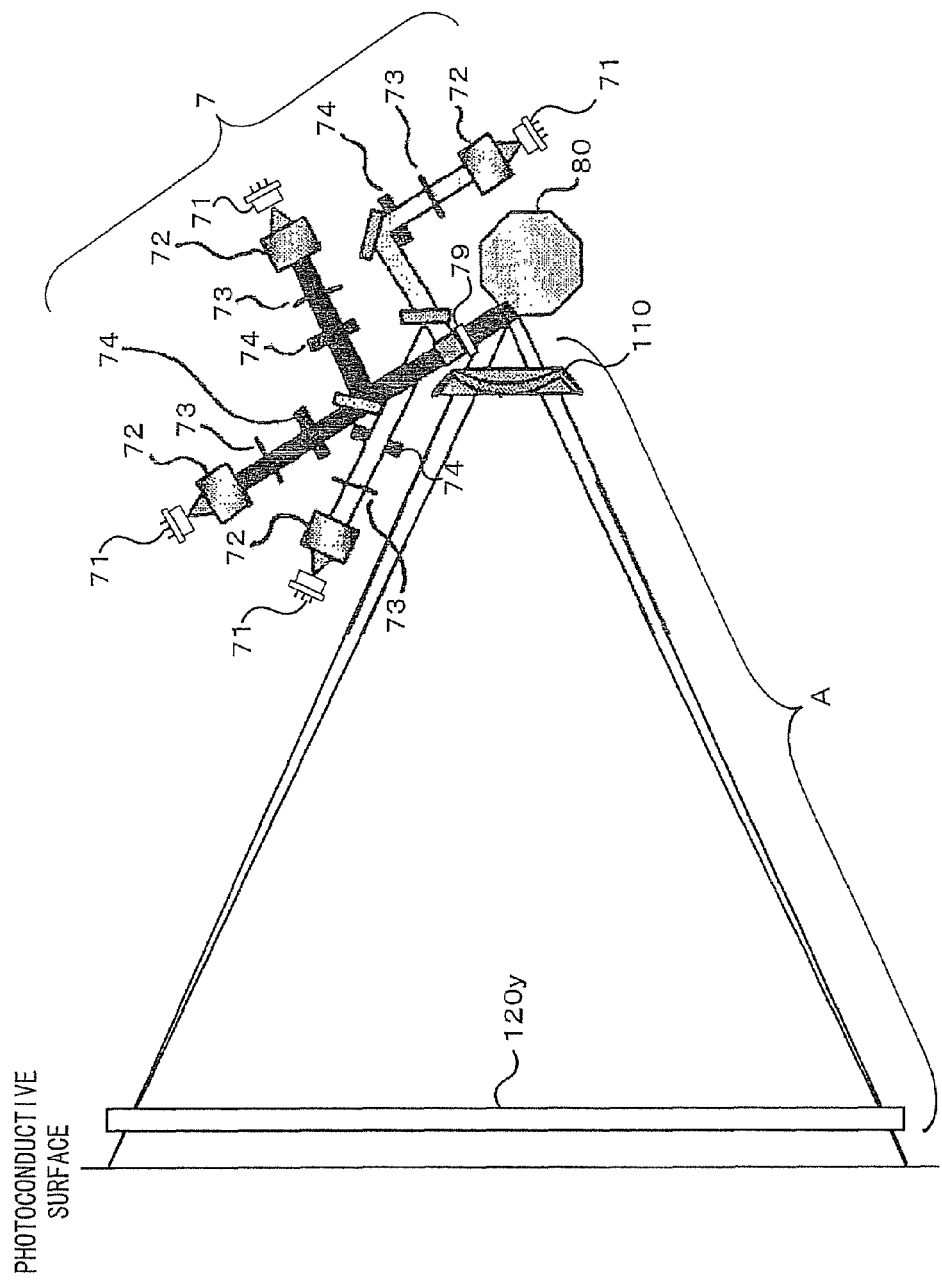
FIG. 1 is a diagram showing optical paths in an optical system in an optical beam scanning device according to an embodiment of the invention.
Figure 2:
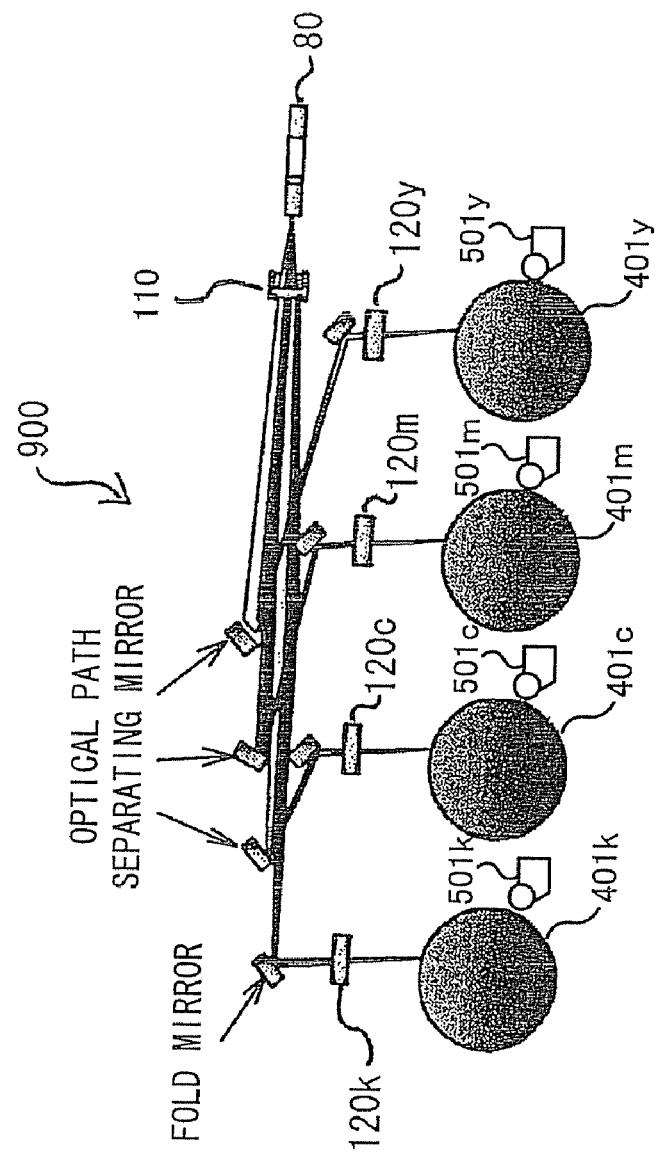
FIG. 2 is a sectional view in a sub-scanning direction showing a schematic structure of an image forming apparatus 900 including the optical beam scanning device according to the embodiment.

FIG. 1 is a diagram of optical paths in an optical system in an optical beam scanning device according to an embodiment of the invention viewed from a sub-scanning direction. FIG. 2 is a sectional view in the sub-scanning direction showing a schematic structure of an image forming apparatus 900 including the optical beam scanning device according to this embodiment.

As shown in FIGS. 1 and 2, an optical beam scanning device 1 according to this embodiment includes a pre-deflection optical system 7, a polygon mirror (a rotating deflector) 80, and a post-deflection optical system A.

The optical beam scanning device 1 shapes diverging rays from light sources to be light beams having a predetermined sectional shape in a pre-deflection optical system including plural optical elements and deflects the light beams shaped by the pre-deflection optical system with a rotating deflector to cause the light beams to scan in a main scanning direction on photoconductive surfaces of respective plural photoconductive members $401y$ to $401k$. The light beams caused to scan by the optical beam scanning device 1 form electrostatic latent images on the photoconductive surfaces of the photoconductive members $401y$ to $401k$. The electrostatic latent images formed on the respective photoconductive members are visualized by developing units $501y$ to $501k$ using developing agents of colors corresponding to the respective photoconductive members. Optical paths from respective light sources in the pre-deflection optical system are formed to be optical paths inclined at a predetermined angle with respect to the polygon mirror 80 such that the optical paths travel to photoconductive members to which the optical paths should be guided (see FIG. 5 described later).

Details of the optical beam scanning device 1 according to this embodiment will be hereinafter explained.

The polygon mirror 80 reflects and deflects incident light beams with plural reflecting surfaces arrayed in a rotating direction thereof to cause the incident light beams to scan in the main scanning direction.

The pre-deflection optical system 7 includes light sources 71 made of LDs, finite focus lenses (or collimator lenses) 72 that change diverging rays from the light sources 71 to convergent rays, parallel rays, or gentle diffused rays, apertures 73, and cylinder lenses 74 that condense light beams near the polygon mirror 80.

The pre-deflection optical system 7 further includes an optical element 79 that is arranged in a position on a most downstream side between the light sources in a light beam traveling direction and the reflecting surfaces of the polygon mirror 80 and has negative power. Details of this optical element 79 will be described later.

With such a structure, the pre-deflection optical system 7 shapes light from the light sources 71 to be, for example, light beams of a predetermined sectional shape long in the main scanning direction to guide the light beams to the polygon mirror 80 and condenses the light beams in the sub-scanning direction near the reflecting surfaces of the polygon mirror 80.

The post-deflection optical system A is formed of a resin material such as plastics and includes an fθ lens 110 that has a free-form surface of a power distribution in which power changes continuously and cylinder lenses $120y$ to $120k$ (plural optical elements) that are provided on optical paths between a shared optical element and the respective photoconductive members in association with the respective photoconductive members $401y$ to $401k$ and formed as convex surfaces on plane of incidence sides thereof and have positive power.

With such a structure, the post-deflection optical system A guides the respective light beams reflected and deflected by the respective plural reflecting surfaces in the polygon mirror 80 to the photoconductive surfaces of the photoconductive members $401y$ to $401k$ corresponding to the respective reflecting surfaces through optical paths different from one another.

Curvatures of the fθ lens 110 independently change in two directions of the main scanning direction and the sub-scanning direction. The fθ 1 lens 110 in this context is equivalent to the shared optical element. The power distribution of the fθ lens 110 is set as a power distribution that gives power to all light beams reflected and deflected by the polygon mirror 80 and guided to the respective plural photoconductive members $401y$ to $401k$ according to positions of incidence of the light beams in cooperation with the cylinder lenses $120y$ to $120k$ that act on rays guided to the respective individual photoconductive members such that the light beams guided to the photoconductive surfaces by the post-deflection optical system A have a predetermined optical characteristic (e.g., a characteristic that satisfies predetermined conditions concerning a beam diameter of a light beam, a degree of bending of a scanning line, a position of the light beam with respect to a scanning range, and the like) on the photoconductive surfaces. In this way, the shared optical element has a smooth lens surface that acts on all the light beams reflected and deflected by the respective plural reflecting surfaces in the polygon mirror 80 and made incident on positions different from one another in the sub-scanning direction.

As described above, by combining a part of the optical elements conventionally provided independently for each of the photoconductive members into the shared optical element and giving power to all the light beams, which should be guided to the plural photoconductive members, with the shared optical element, it is possible to contribute to a reduction in an arrangement space of optical components in the sub-scanning direction. Since it is possible to reduce the number of optical components that should be arranged, it is possible to prevent deterioration in an optical characteristic due to arrangement errors and the like of the respective optical components and also contribute to a reduction in cost.

By combining a part of the optical elements independently provided for each of the photoconductive members into the shared optical system, it is possible to set tilt angles of the light beams reflected and deflected on the respective reflecting surfaces of the polygon mirror to small angles and reduce an arrangement space in the sub-scanning direction of the optical system.

The "predetermined optical characteristic" in this context means an optical characteristic desirable in forming electrostatic latent images on the photoconductive surfaces of the photoconductive member.

Figure 3:
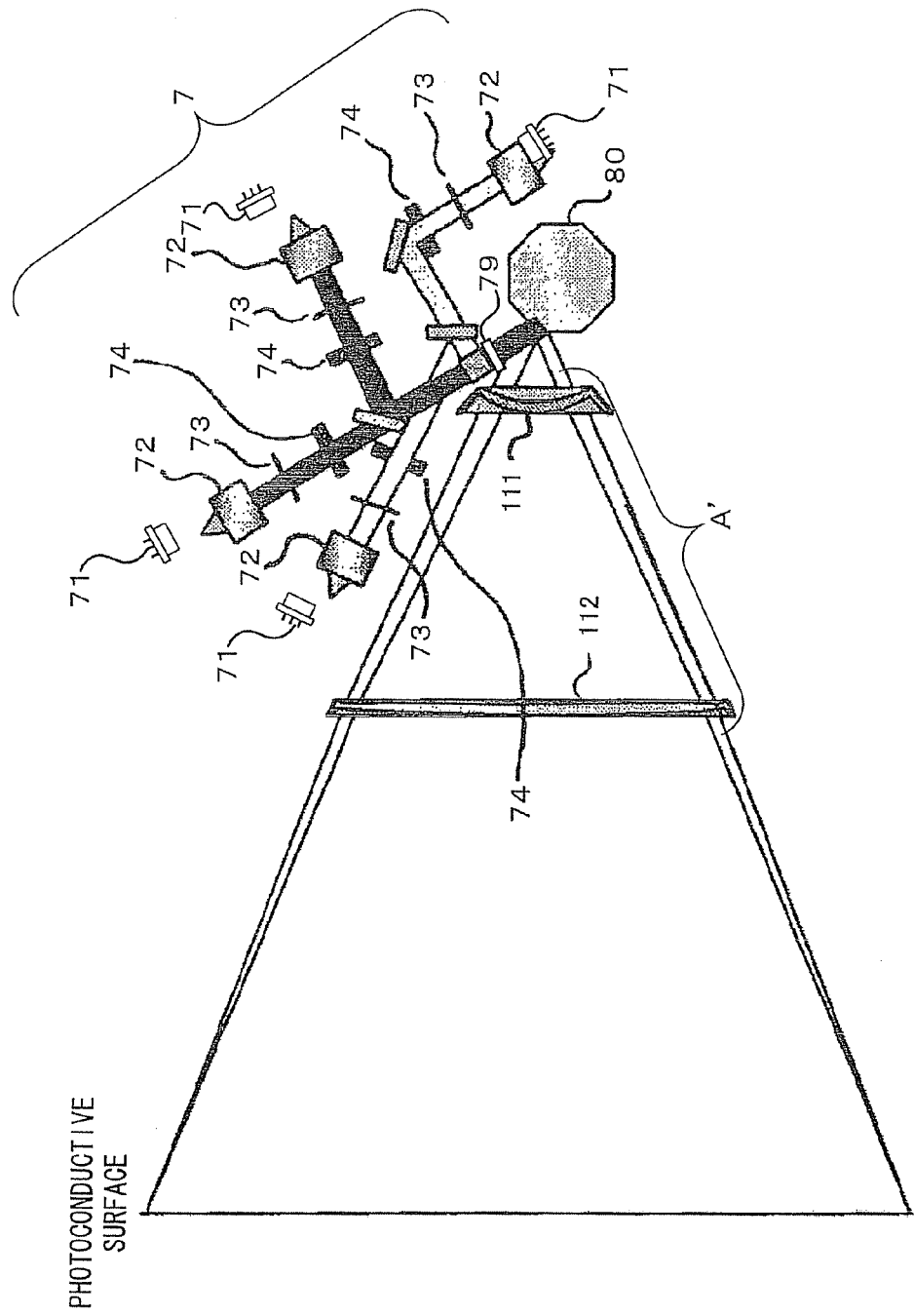
FIG. 3 is a diagram showing an example of an optical system in which a shared optical element is formed by two fθ lenses, i.e., an fθ 1 lens 111 and an fθ 2 lens 112.
Figure 4:
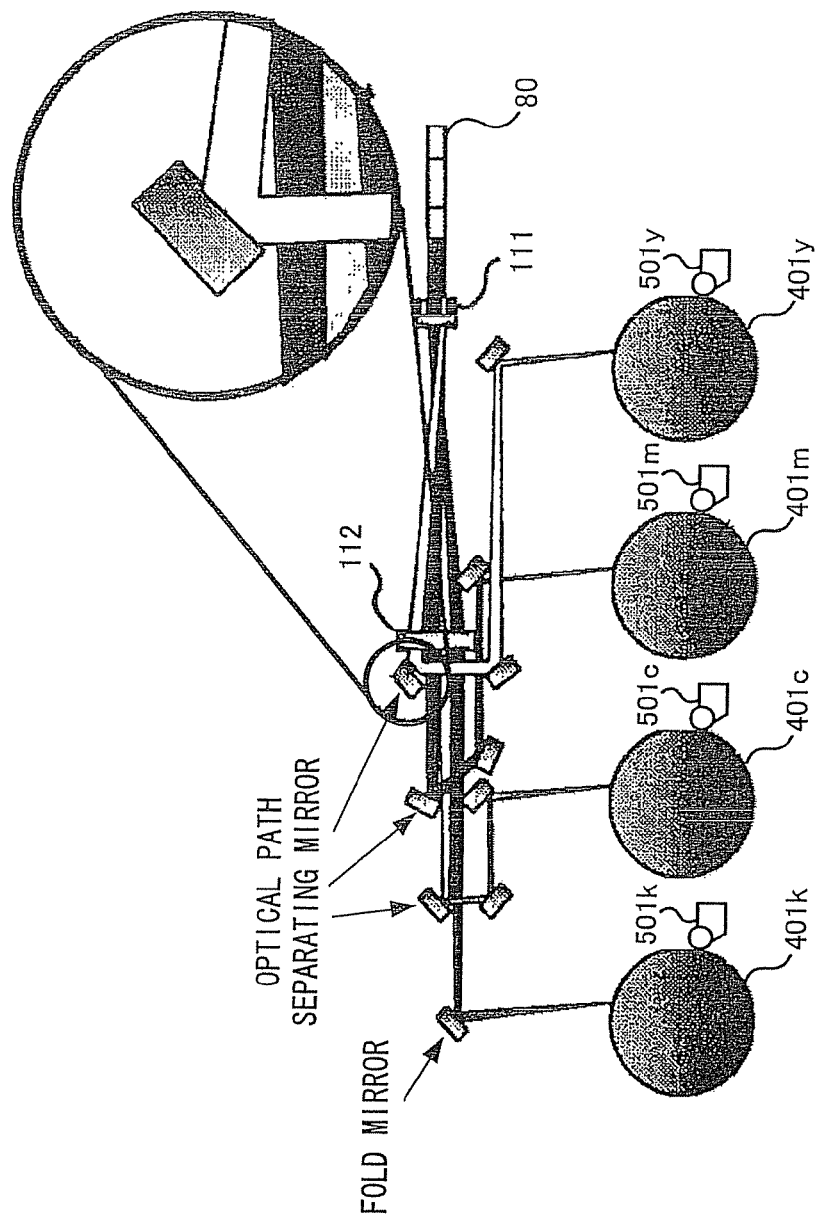
FIG. 4 is a diagram showing an example of the optical system in which the shared optical element is formed by the two fθ lenses, i.e., the fθ 1 lens 111 and the fθ 2 lens 112.

In FIGS. 1 and 2, the shared optical element is made of one fθ lens. However, the invention is not limited to this. It is also possible to form the shared optical element with two or more fθ lenses. FIGS. 3 and 4 show an example of an optical system in which a shared optical element is formed by two fθ lenses, i.e., an fθ 1 lens 111 and an fθ 2 lens 112. By forming the shared optical element with plural lenses in this way, compared with the case in which the shared optical element is formed by one lens, it is possible to set curvatures of lens surfaces of the respective lenses gentle, machining becomes easy, and it is possible to contribute to a reduction in manufacturing cost and improvement of machining accuracy (improvement of an optical characteristic).

When the shared optical element is formed by the fθ 1 lens 111 and the fθ 2 lens 112, for example, it is possible to set a continuously changing power distribution for both planes of incidence and planes of exit of the respective fθ 1 lens 111 and fθ 2 lens 112. However, it is not always necessary to set such a power distribution for all the lens surfaces of the shared optical element. In general, when the shared optical element is formed by the plural lenses in this way, lenses located on a downstream side in a light beam traveling direction often have larger sizes. In other words, since light beams made incident on the lenses on the downstream side in the light beam traveling direction have smaller beam diameters and have large moving distances of the light beams at the same oscillating angle compared with lenses located on an upstream side, it is considered that there is a significant effect in setting the continuously changing power distribution as described above. Thus, when the shared optical element described above is formed by the plural lenses, it is preferable to give continuously changing power described above to the side of the plane of exit of the lens located on the most downstream side in the light beam traveling direction (i.e., a side closest to an image surface).

On the other hand, by forming the shared optical element with one lens, it is possible to reduce the number of components of the optical system and contribute to a reduction in cost compared with the structure in which the plural fθ lenses are used.

Figure 5:
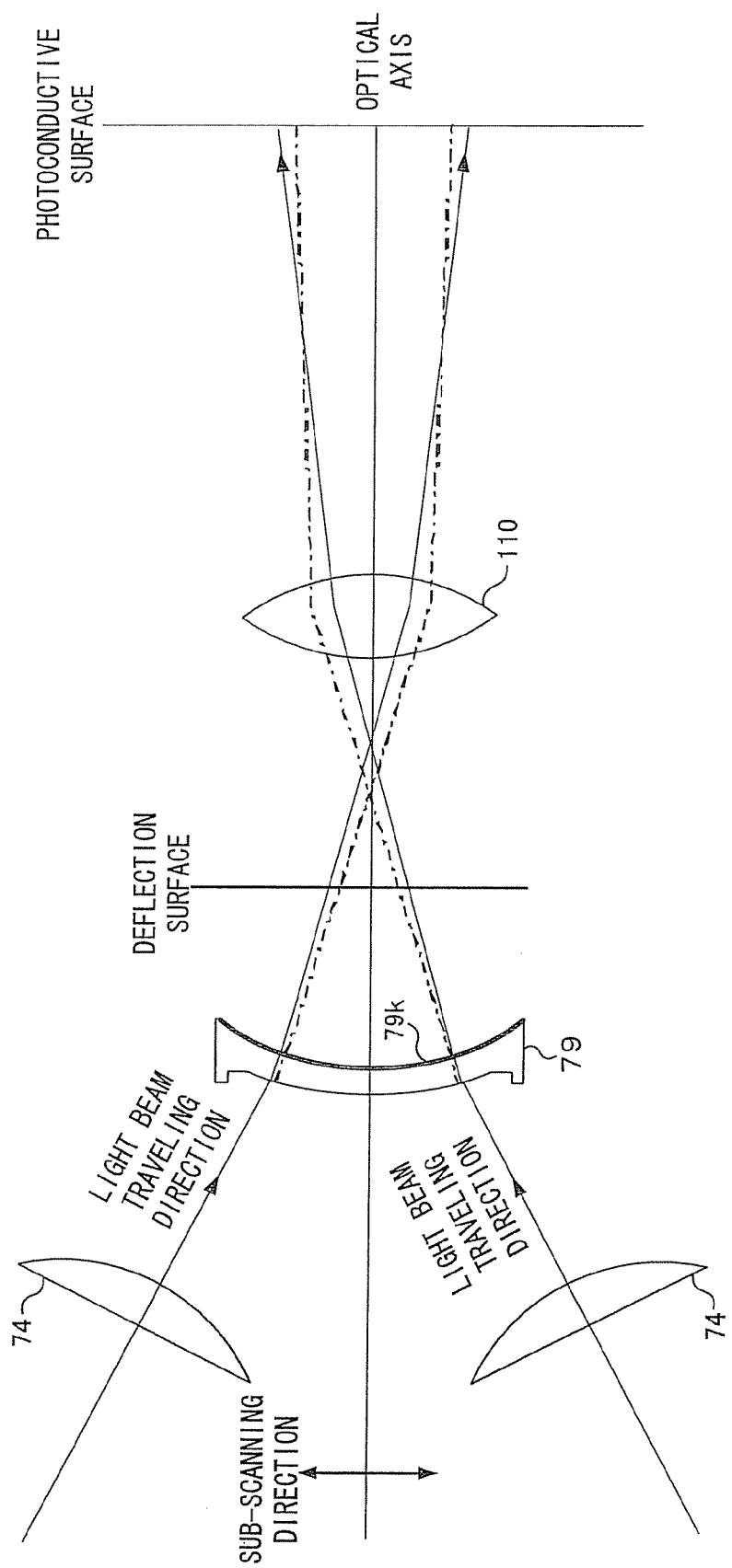
FIG. 5 is a diagram for explaining an arrangement and an optical characteristic of an optical element 79.

The optical element 79 in the pre-deflection optical system 7 of the optical beam scanning device according to this embodiment will be described in detail. FIG. 5 is a diagram for explaining an arrangement and an optical characteristic of the optical element 79.

A diffraction grating is formed on a plane of exit 79k of light beams in the optical element 79.

The optical element 79 in this context is, among plural optical elements forming the pre-deflection optical system, a plastic lens in which respective light beams from the plural light sources 71 are made incident on positions of incidence different from one another in the sub-scanning direction orthogonal to the main scanning direction. The light beams from the respective light sources made incident on the optical element 79 only have to be made incident on positions of incidence different from one another in the sub-scanning direction. Any one of plural light beams is made incident through one optical axis. By forming a diffraction grating in the optical element in which the light beams from the respective light sources are made incident on different positions in the sub-scanning direction in this way, it is possible to perform relative interval adjustment and angle adjustment among the respective light beams corresponding to a temperature change.

When only a single light beam from one light source is made incident on the optical element 79, an optical element in which a diffraction grating should be formed is, among the plural optical elements forming the pre-deflection optical system 7, an optical element in which the light beam from the light source is made incident on a position of incidence different from the optical path of the optical axis of the pre-deflection optical system 7 in the sub-scanning direction orthogonal to the main scanning direction. Basically, since it is impossible to give power to a light beam made incident through the optical axis, it is at least necessary to make the light bream incident on a position different from the optical axis in order to perform correction of a color aberration corresponding to a temperature change due to the diffraction grating.

The optical element 79 in this embodiment gives power to all the light beams reflected and deflected by the polygon mirror 80 and guided to the respective plural photoconductive members 401y to 401k. By arranging the diffractive optical element in the pre-deflection optical system in this way, even when efficiency of diffraction changes because of a temperature change and the like, since an influence of the change acts in all areas in the main scanning direction, fluctuation in the efficiency of diffraction does not guide to density unevenness and the like of an image in the main scanning direction. Thus, it is possible to contribute to stabilization of an image quality.

The diffraction grating formed on the plane of exit 79k of the optical element 79 has power in the sub-scanning direction. It is possible to control occurrence of a "vertical color aberration" and a "horizontal color aberration" with the diffraction grating. Here, the "horizontal color aberration" is equivalent to a magnification color aberration and the "vertical color aberration" is equivalent to a color aberration that occurs in an optical axis direction (i.e., a difference in a focal point or a difference in a position of an on-axis image point due to a wavelength).

The diffraction grating formed on the optical element 79 does not always have to have power in the sub-scanning direction. The diffraction grating may have power only in the main scanning direction. When the diffraction grating formed on the optical element 79 is the diffraction grating having power only in the main scanning direction in this way, it is possible to control occurrence of the "vertical color aberration" in the main scanning direction (reduce a defocus amount).

It goes without saying that, taking into account manufacturing cost and man-hour, the diffraction grating formed on the optical element 79 may give power in both the main scanning direction and the sub-scanning direction.

Figure 6:
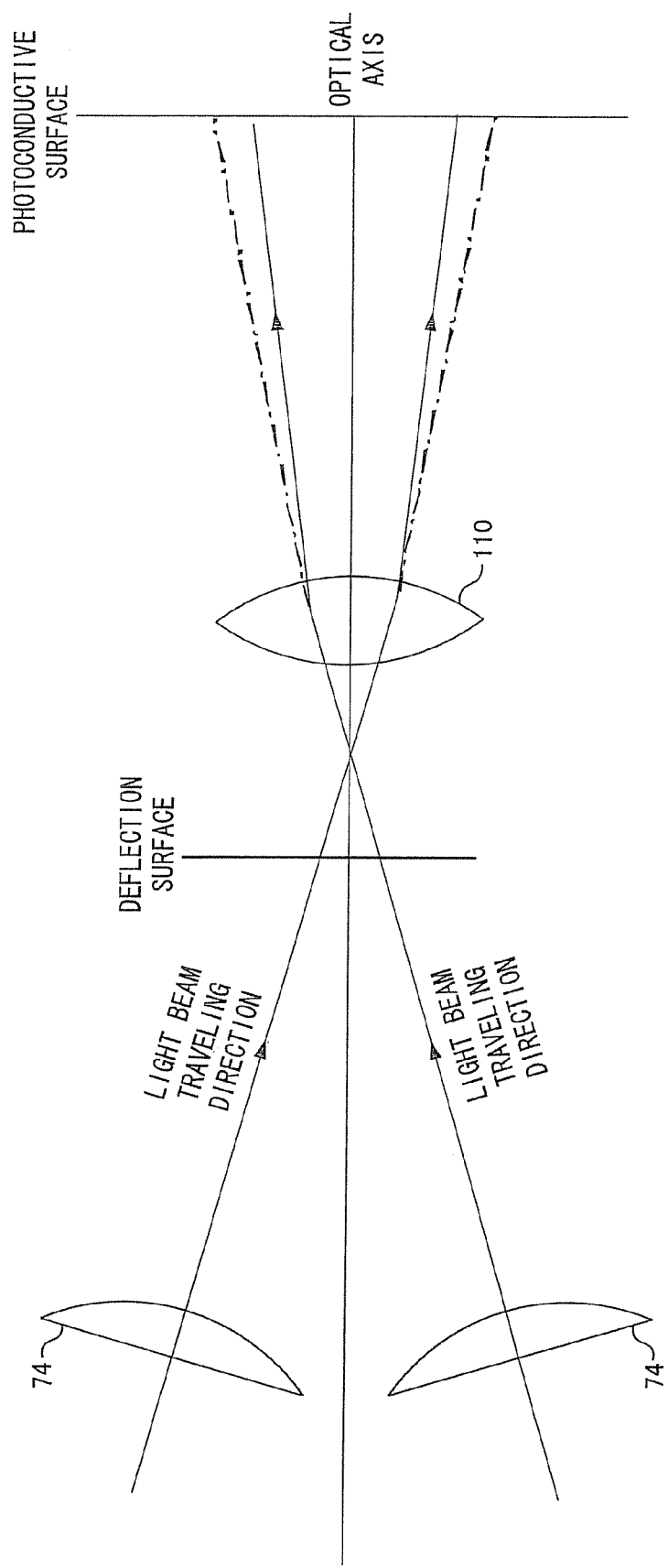
FIG. 6 is a diagram showing a state of fluctuation in optical paths of light beams due to a temperature change in a conventional optical system.

FIG. 6 is a diagram showing a state of fluctuation in optical path of light beams due to a temperature change in the conventional optical system. In FIGS. 5 and 6, solid lines indicate the optical paths of the light beams in a state before the temperature change occurs and alternate long and short dash lines indicate the optical paths of the light beams in a state in which the temperature change has occurred.

As shown in FIG. 6, usually, when an environmental temperature rises, an absolute value of power of the lenses decreases because of an effect of an increase in dimensions of the lenses due to thermal expansion and an effect of a decrease in an index of refraction of a lens material. Consequently, an inter-beam pitch on an image surface in the case in which folding by a fold mirror is developed increases.

In general, in a semiconductor laser, when an environmental temperature fluctuates, a wavelength of light to be emitted also changes according to this temperature change. The diffraction grating has a characteristic that power also changes according to the fluctuation in the wavelength of incident light and the environmental temperature.

In the optical beam scanning device according to this embodiment, the lens having negative power is arranged immediately before the polygon mirror. However, when the optical element without the diffraction grating is simply arranged, a range in which light beams can be corrected is limited. Thus, in this embodiment, the range in which light beams can be corrected is increased by providing the diffraction grating in the lens having negative power. It is possible to perform only correction corresponding to "temperature" with the lens alone. However, when the diffraction grating is added, it is also possible to perform correction corresponding to "wavelength". This makes it possible to increase adjustment parameters and improve a degree of freedom of correction.

In this way, since the optical element 79 on which the diffraction grating in this embodiment is formed is provided, it is possible to give an action for correcting optical paths in a direction in which the inter-beam pitch on the image surface in the case in which the folding by the fold mirror is developed decreases when the environmental temperature rises (in a direction in which a color drift caused by a temperature change of an environment in which the image forming apparatus is placed). It is possible to set an amount of change in the inter-beam pitch on a scanned surface to an arbitrary value making use of the action (it is difficult to give an action for correcting optical paths in a direction in which the pitch decreases while controlling occurrence of defocus).

Details of the optical characteristic set for the optical element 79 having the structure described above will be explained.

Figure 7:
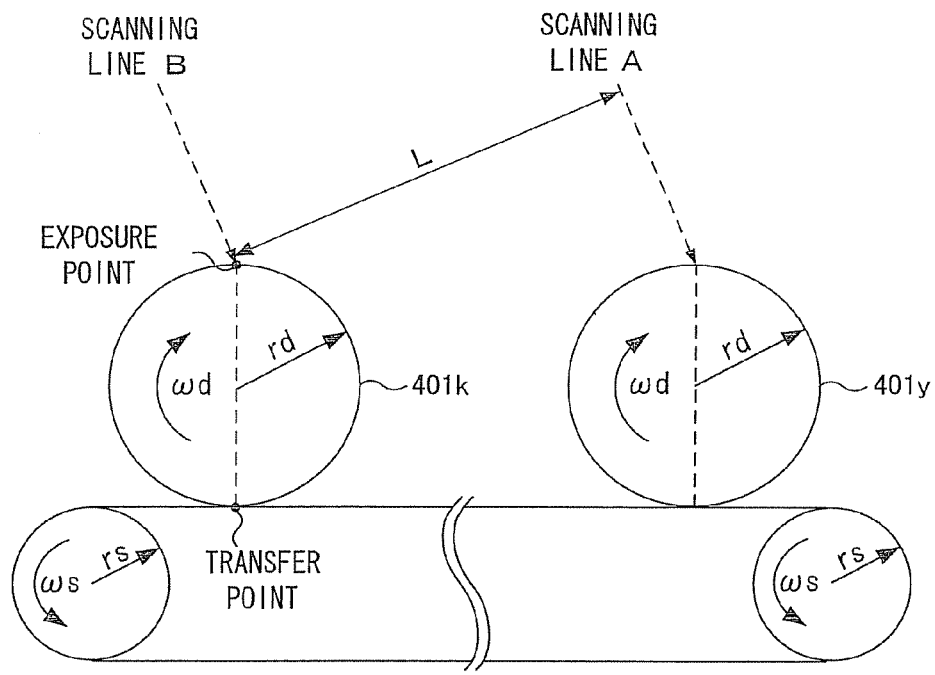
FIG. 7 is a diagram for explaining misregistration in an image forming apparatus 900 due to a change in an environmental temperature.
Figure 8:
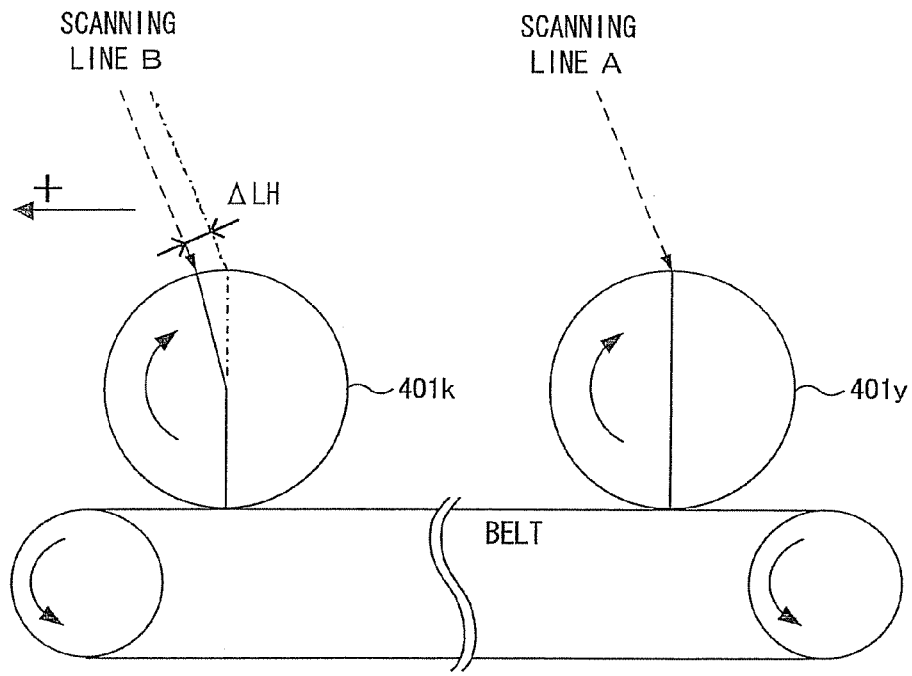
FIG. 8 is a diagram for explaining the misregistration in the image forming apparatus 900 due to the change in the environmental temperature.
Figure 9:
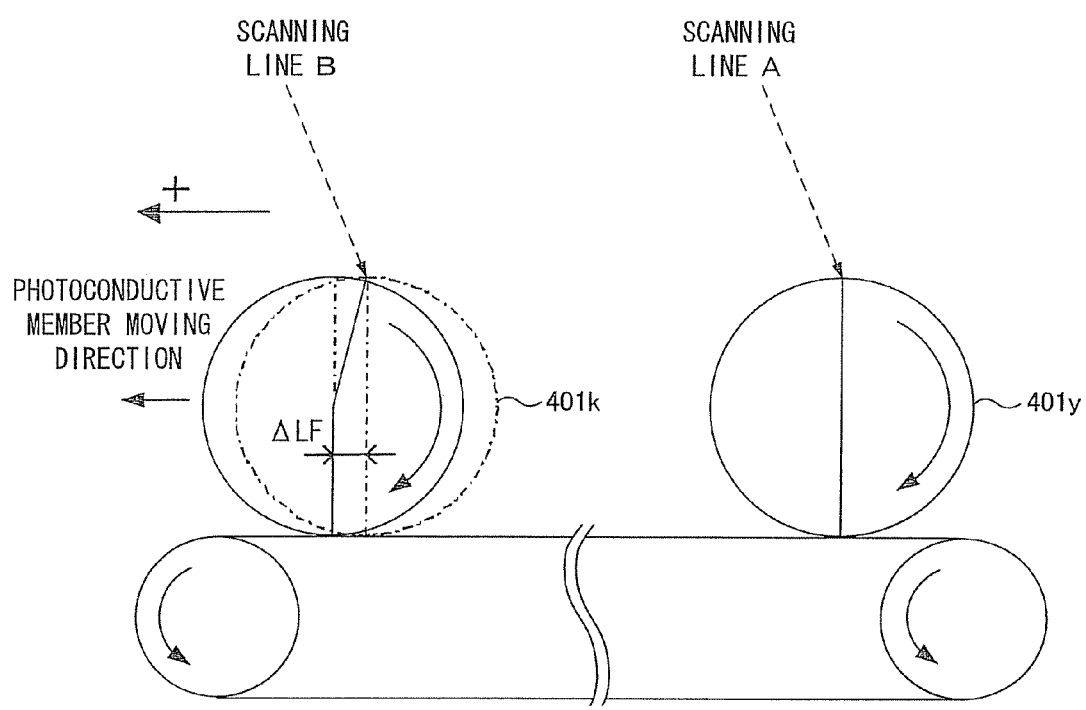
FIG. 9 is a diagram for explaining the misregistration in the image forming apparatus 900 due to the change in the environmental temperature.

FIGS. 7 to 9 are diagrams for explaining misregistration in the image forming apparatus 900 due to a change in an environmental temperature. In FIGS. 7 to 9, the misregistration will be explained with a positional relation between the photoconductive members 401k and 401y as an example.

Here, in FIGS. 7 to 9, when
a ray interval is set as L,
a photoconductive drum radius is set as $r_d$,
a photoconductive drum rotation speed is set as $\omega_d$,
a transfer belt driving shaft radius is set as $r_s$,
a transfer belt driving shaft rotation angular speed is set as $\omega_s$, and
an angle of a straight line defining the beam interval and a straight line connecting drums is set as $\gamma$,
a relation of Expression (1) below holds.

$$r_d \times \omega_d \cong r_s \times \omega_s = v \tag{1}$$

Here, in order to superimpose images in the same place, exposure is performed with a time difference of $$T = L/\cos \gamma / (r_s \times \omega_s) \tag{2}$$

provided between timing for writing an image with a scanning line A and timing for writing an image with a scanning line B.

First, an influence of fluctuation in positions of the scanning lines will be considered.

When a ray interval shifts by $\Delta L_H$, time when an image written on the photoconductive member by the scanning line B reaches a transfer point delayed by time represented as follows (see FIG. 8).

$$\Delta T = \Delta L_H / \cos \gamma / v \cong \Delta L_H / \cos \gamma / v \tag{3}$$

When this is represented as a positional relation of the image formed on the belt, the image formed by the scanning line B shifts to a rear side (a right side in FIG. 8) by an amount represented as follows.

$$v \times \Delta T \cong \Delta L_H / \cos \gamma \tag{4}$$

An influence of fluctuation in positions of photoconductive members will be considered.

When an interval between the photoconductive members shifts by $\Delta L_F$, time when the image written by the scanning line B reaches the transfer point is delayed by time represented as follows.

$$\Delta i\, T = -\Delta L_F / v \tag{5}$$

Because of this influence, the image written by the scanning line B shifts to the rear side (a left side in FIG. 9) by an amount represented as follows (since a sign is minus, the image written by the scanning line B shifts to the left side by $\Delta LD$).

$$v \times \Delta T = -\Delta L_F \tag{6}$$

Since the transfer point also shifts to the left side by $\Delta L_F$, in total, the image written by the scanning line B shifts to the rear side (a right side in FIG. 9) by an amount represented as follows (since a sign is minus, the image written by the scanning line B shifts to the left side by $2 \times \Delta L_F$).

$$-2 \times \Delta L_F \tag{7}$$

An influence of fluctuation in a shaft diameter will be considered.

When the shaft diameter increases by $\Delta r_s$, v increases by $\Delta r_s \omega_s$. Therefore, a distance the belt (or a medium such as a sheet conveyed on the belt) travels in the same time T increases by an amount represented as follows.

$$\Delta r_s \omega_s T = \Delta r_s / r_s \times L / \cos \gamma \tag{8}$$

The image written by the scanning line B shifts to the rear side (the right side in FIG. 9) by an amount represented as follows.

$$\Delta r_s / r_s \times L / \cos \gamma \tag{9}$$

In order to take into account all the influences of the "fluctuation in positions of the scanning lines", the "fluctuation in positions of the photoconductive members", and the "fluctuation in a shaft diameter", when Expressions (4), (7), and (9) are added up, shift represented as follows occurs.

$$\Delta L_H / \cos \gamma - 2 \times \Delta L_F + \Delta r_s / r_s \times L / \cos \gamma \tag{10}$$

When combined linear expansion coefficients (combined thermal expansion coefficients) of a housing, a frame that supports the respective photoconductive members and defines a positional relation among the respective photoconductive members, and a driving shaft that drives the belt in the image forming apparatus 900 are set as $\alpha_H$, $\alpha_F$, and $\alpha_S$ and a rising temperature is set as t, the following expressions are obtained.

$$\Delta L_H = \alpha_H \times L \times t \tag{11}$$

$$\Delta L_F = \alpha_F \times L \times t / \cos \gamma \tag{12}$$

$$\Delta r_s = \alpha_S \times r_s \times t \tag{13}$$

Thus, when Expressions (11) to (13) are substituted in Expression (10), a shift represented by the following expression is calculated (plus indicates the rear side (the right side in FIG. 9)).

$$\alpha_H \times L \times t / \cos \gamma - 2 \times \alpha_F \times L \times t / \cos \gamma + \alpha_S \times r_s \times t / r_s \times L / \cos \gamma = (\alpha_H - 2 \times \alpha_F + \alpha_S) / \cos \gamma \times (L \times t) \tag{14}$$

To cancel this shift in a position of the scanning line B, as it is evident from Expression (4), the scanning line B only has to move by a distance $\times \cos \gamma$ in the same absolute amount as and with an inverse sign of Expression (14) as represented as follows.

$$-(\alpha_H - 2 \times \alpha_F + \alpha_S) \times (L \times t) \tag{15}$$

This means that an inter-beam pitch is set as $-(\alpha_H - 2 \times \alpha_F + \alpha_S) \times (L \times t)$. In other words, rather than not moving a beam position, if the beam position is moved by an amount represented by Expression (15), a shift on an image does not occur even when a temperature change occurs.

Expansion of an optical housing and fluctuation in an interval between the scanning lines due to thermal expansion of the optical housing are just the same as assumed above when a sub-scanning direction inter-beam pitch expands by $\alpha_H \times LB \times t$ (here, LB is a sub-scanning beam position interval on an image surface at the time when optical path folding from a deflection surface to the image surface is developed).

Therefore, if a scanned surface beam position at the time when the fold mirror is developed can be shifted by an amount represented as follows, it is possible to prevent occurrence of a shift of color superimposition due to a temperature change and control a color drift amount at the time when registration control is not performed. It is also possible to extend a time interval for executing registration control.

$$-(\alpha_H - 2 \times \alpha_F + \alpha_S) \times (L \times t) + \alpha_H \times LB \times t \tag{16}$$

When combined linear expansion coefficients (combined thermal expansion coefficients) of the housing that supports the plural optical elements forming the optical beam scanning device, the frame that supports the respective photoconductive members and defines a positional relation among the respective photoconductive members, and the driving shaft that drives the belt in the image forming apparatus 900 are set as $\alpha_H$, $\alpha_F$, and $\alpha_S$, a rising temperature is set as t, and an inter-scanning line pitch is set as L, if temperature rises t degrees, a shift occurs by an amount represented as follows.

$$(\alpha_H - 2\times\alpha_F + \alpha_S)\times(L\times t) \quad (17)$$

By adopting the structure of this embodiment shown in FIG. 5, if a beam position on the scanned surface at the time when the fold mirror is developed shifts by an amount represented as follows according to a temperature change, it is possible to prevent occurrence of a shift of color superimposition due to the temperature change, control a color drift amount at the time when registration control is not performed, and reduce a frequency of execution of the registration control.

$$-(\alpha_H - 2\times\alpha_F + \alpha_S)\times(L\times t) + \alpha_H\times LB\times t \quad (18)$$

In this way, in the structure shown in FIG. 5, by performing an optimum optical power arrangement for a refractive lens and a grating lens (a lens of a form with an diffractive optical element surface added to a refractive lens surface), it is possible to change the sub-scanning direction beam position by an amount enough for canceling a color drift due to thermal expansion of the image forming apparatus. Moreover, by performing the optimum optical power arrangement, it is possible to provide an optical system that reduces temperature dependency of a sub-scanning direction imaging surface.

Concerning the main scanning direction, by arranging a plastic lens having functions of a refractive lens and a grating lens having proper negative power in the main scanning direction in the pre-deflection optical system, it is also possible to correct a change in a beam waist position (a position where light beams are condensed) in the main scanning direction, which occurs in the post-deflection optical system because of a temperature change, by shifting the imaging surface in a direction opposite to a direction in which the change occurs in the post-deflection optical system.

Specific examples of the invention will be explained. In the respective examples described below, an example in which the optical system including two fθ lenses shown in FIGS. 3 and 4 is adopted will be described.

FIRST EXAMPLE

First, a first example of the invention will be explained.

When an optical system housing material is aluminum die cast (linear expansion coefficient $\alpha_H = 2.1\times10^{-5}$), a material defining a photoconductive member interval is aluminum die cast (linear expansion coefficient $\alpha_F = 2.1\times10^{-5}$), a transfer belt driving shaft material is free-cutting steel (linear expansion coefficient $\alpha_S = 1.15\times10^{-5}$), an interval of rays made incident on the photoconductive members at both ends (the photoconductive members 401$k$ and 401$y$) is L=225 mm, and a temperature rise is t=15 degrees, an ideal amount of change in inter-beam distance at both ends in the sub-scanning direction is represented as follows (this means that a color superimposition shift of 38 μm/cos γ occurs when a sub-scanning direction position of a ray is not shifted at all when temperature changes).

$$-(\alpha_H - 2\times\alpha_F + \alpha_S)\times(L\times t) + \alpha_H\times LB\times t = 0.038 \quad (19)$$

Figure 10:
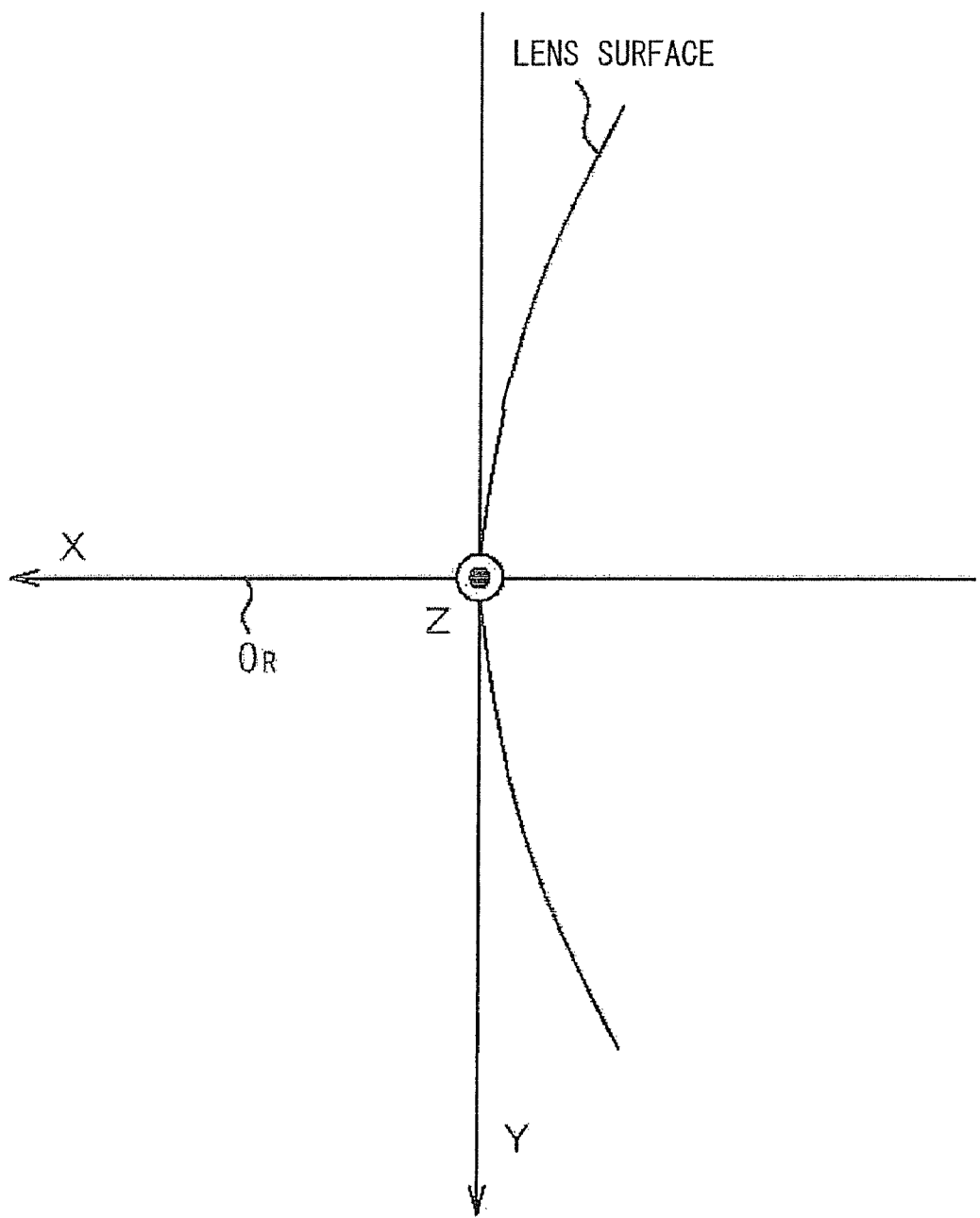
FIG. 10 is a diagram showing an example of a coordinate system in defining a shape of a lens surface.

A shape of a refractive lens surface of the optical element 79 is represented by, for example, a shape definition formula shown in FIG. 11, when the shape of the lens surface is represented by a coordinate system shown in FIG. 10. In the definition formula shown in the figure, in this example, ay=1 and az=1.

An optical path difference function defining a pattern of a diffraction grating formed on the optical element 79 is represented by the following polynomial.

$$\Phi = \Sigma c_{1m} \times y^1 \times z^m \quad (20)$$

FIGS. 12 to 16 are examples of data tables that define a lens surface of the optical element 79 and a diffraction grating formed on the lens surface. In this example, a diffractive surface is provided on an exit surface side of a free-form surface correction lens added with a diffractive optical element. Here, a design wavelength of the diffractive optical element is 655 nm and a material of the lens is COP (cycloolefin polymer).

ν shown in FIG. 13 is equivalent to an Abbe number defined from an index of refraction at the time when temperature changes by ±15 degrees and a value of a wavelength change of a laser diode.

A value for a refractive lens $$\nu = (n(\text{an index of refraction at the time of 25 degrees}) - 1)/(n(\text{an index of refraction at the time of 10 degrees}) - n(\text{an index of refraction at the time of 45 degrees})) = 169.8230 \quad (21)$$

A value for a grating lens $$\nu = \lambda(\text{a wavelength at the time of 25 degrees})/(\lambda(\text{a wavelength at the time of 10 degrees}) - \lambda(\text{a wavelength at the time of 45 degrees})) = -121.2963 \quad (22)$$

$\Sigma\phi/\nu$ shown in FIG. 13 is a sum of $\phi/\nu$ of the refractive lens and the grating lens of the free-form surface correction lens added with the diffractive optical element.

In order to prevent defocus from being shifted, an on-axis achromatic condition is $\Sigma\phi/\nu=0$ ($\phi=1/f$ and indicates power) including the lens of the post-deflection optical system. Signs of ν of the refractive lens and the grating lens are different. Thus, it is possible to freely set combined power ($\Sigma\phi$) and the value $\Sigma\phi/\nu$ concerning achromat.

However, in the invention, a horizontal color aberration is set such that, for example, when temperature changes 15 degrees, a sub-scanning direction beam interval of beams at both ends in the sub-scanning direction widens about 32 μm. Thus, concerning the sub-scanning direction, $\Sigma\phi/\nu$ is not always 0.

A material of the optical element 79 in this example is the same as a material of the optical element forming the post-deflection optical system (power is described in FIG. 13).

A part of these optical components are arranged with eccentricity and inclination (see FIG. 14). Eccentricity and inclination are given on one surface shown in FIG. 14. Consequently, in the free-form surface correction lens (the optical element 79) added with the diffractive optical element, height and an angle of incidence of each ray are different. Since the height and the angle of incidence are different, an amount of change in a sub-scanning direction beam position is set to a predetermined value making use of differences in refracting power and a rate of change of the refracting power at the time of a temperature change due to the differences in the height and the angle of incidence.

Figure 17:
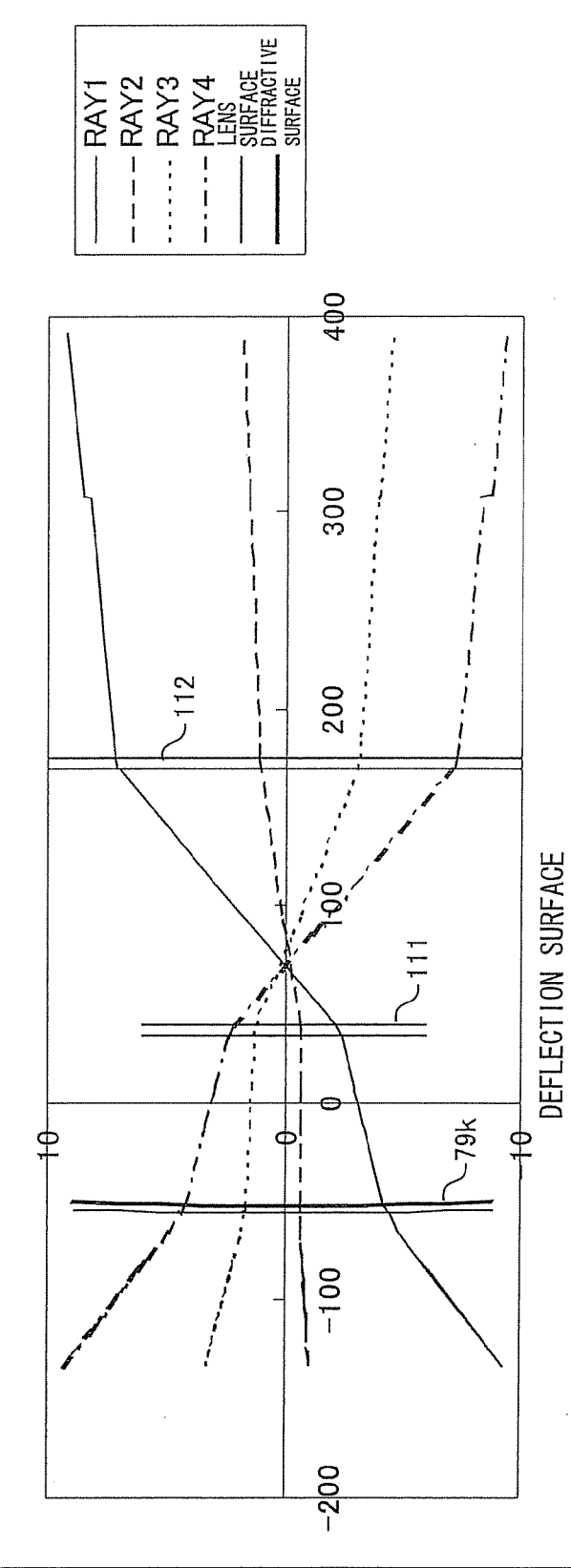
FIG. 17 is a diagram showing principal rays of respective plural light beams emitted from plural light sources 71 and sub-scanning direction sections of the optical element 79, the fθ1 lens 111, and the fθ2 lens 112 lens in a first example.

FIG. 17 is a diagram (a diagram enlarged in the sub-scanning direction) showing principal rays of respective rays RAY1, RAY2, RAY3, and RAY4, which are plural light beams emitted from the plural light sources 71, and sub-scanning direction sections of the optical element 79, the fθ 1 lens 111, and the fθ 2 lens 112 lens in the first example.

As shown in FIG. 18, it is seen that the RAY1 (a ray for Y) and the RAY4 (a ray for black) move a direction in which an interval between the rays widens 35 μm at a temperature rise of 15 degrees. Since the rays move in a direction for canceling a misregistration amount (38 μm/cos γ) of the case in which the rays do not move, even when the temperature rises 15 degrees, a color superimposition shift of only 3 μm/cos γ occurs between yellow and black.

Moreover, amounts of change in defocus in the main scanning and the sub-scanning directions are controlled to be equal to or smaller than 0.2 (see FIG. 18).

Concerning a relation between the RAY2 and the RAY4, L=75×2=150 and the rays move 18 μm in a direction for canceling a misregistration amount (25 μm/cos γ) of the case in which the rays do not move. Thus, a shift is 7 μm/cos γ. Concerning the RAY3 and the RAY4, L=75 and the rays move 13 μm in a direction for canceling a misregistration amount (13 μm/cos γ) of the case in which the rays do not move. Thus, it is possible to control a shift to be 0 μm.

SECOND EXAMPLE

A second example will be explained.

When an optical system housing material is carbon fiber reinforced polycarbonate resin (linear expansion coefficient $\alpha_H$=2.25×$10^{-5}$), a material defining a photoconductive member interval is a cold-rolled steel plate SPCC (linear expansion coefficient $\alpha_F$=1.2×$10^{-5}$), a transfer belt driving shaft material is stainless steel (linear expansion coefficient $\alpha_S$=1.04×$10^{-5}$), an interval of rays made incident on the photoconductive members at both ends (the photoconductive members 401k and 401y) is L=225 mm, and a temperature rise is t=15 degrees, an ideal amount of change in inter-beam distance at both ends in the sub-scanning direction is represented as follows (this means that, when a temperature change occurs, a color superimposition shift of 24 μm/cos γ occurs if a sub-scanning direction position of a ray is not shifted at all).

$$-(\alpha_H - 2\times\alpha_F + \alpha_S)\times(L\times t) + \alpha_H \times LB \times t = -0.024 \quad (23)$$

In the second example, a post-deflection optical system same as that in the first example is used. Members that define heights of the light sources 71, the finite focus lenses 72, and the cylinder lenses 74 of the pre-deflection optical system are made of members separate from the housing that holds all the optical components and are made of metal matrix composites (materials obtained by using a ceramic reinforced material as a filler and combining and integrating the material in a metal matrix). In this example, in the sub-scanning direction, metal matrix composites having different thicknesses are placed between the optical housing and the light sources 71, between the optical housing and the finite focus lenses 72, and between the optical housing and the cylinder lenses 74, respectively, to vary sub-scanning direction positions.

FIGS. 19 to 23 are examples of data tables that define a lens surface of the optical element 79 and a diffraction grating formed on the lens surface. In the optical element 79 in this example, a diffractive optical element surface is formed on a plane of incidence 79f.

Figure 24:
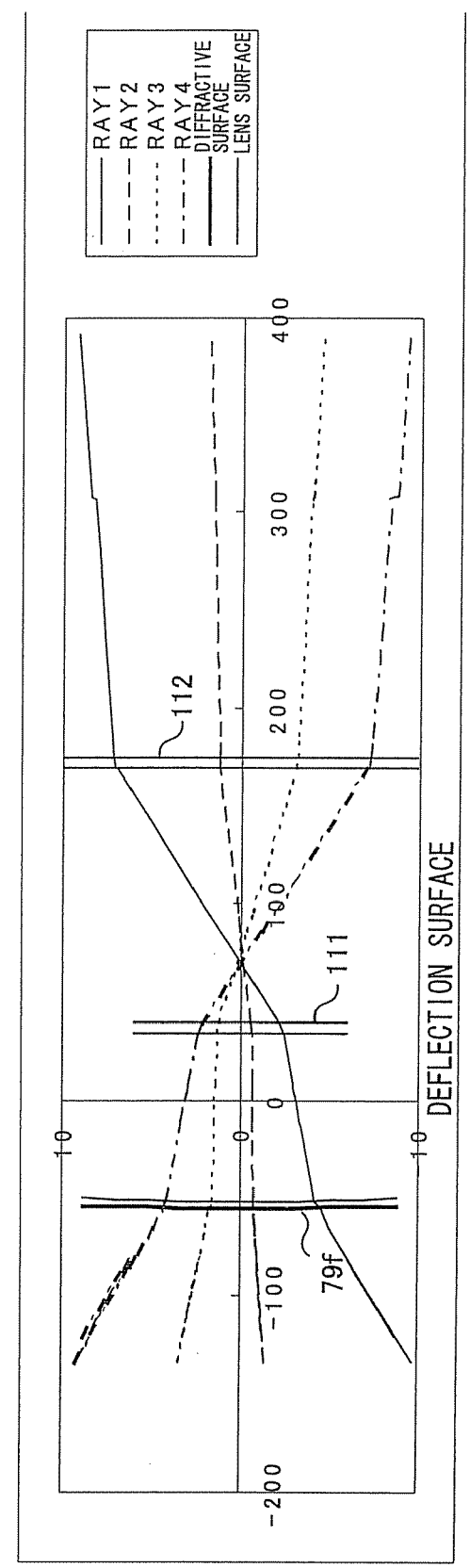
FIG. 24 is a diagram showing principal rays of respective plural light beams emitted from the plural light sources 71 and sub-scanning direction sections of the optical element 79, the fθ 1 lens 111, and the fθ 2 lens 112 lens in a second example.

FIG. 24 is a diagram (a diagram enlarged in the sub-scanning direction) showing principal rays of respective rays RAY1, RAY2, RAY3, and RAY4, which are plural light beams emitted from the plural light sources 71, and sub-scanning direction sections of the optical element 79, the fθ 1 lens 111, and the fθ 2 lens 112 lens in the second example.

As shown in FIG. 25, it is seen that the RAY1 (a ray for Y) and the RAY4 (a ray for black) move in a direction in which an interval between the rays becomes 25 μm smaller than that in housing expansion at a temperature rise of 15 degrees. Since the rays move in a direction for canceling a misregistration amount (24 μm/cos γ) of the case in which the rays do not move, even when the temperature rises 15 degrees, a color superimposition shift of only 1 μm/cos γ occurs between yellow and black.

Concerning a relation between the RAY2 and the RAY4, L=75×2=150 and the rays move 18 μm in a direction for canceling a misregistration amount (16 μm/cos γ) of the case in which the rays do not move. Thus, a shift is 2 μm/cos γ. Concerning the RAY3 and the RAY4, L=75 and the rays move 5 μm in a direction for canceling a misregistration amount (8 μm/cos γ) of the case in which the rays do not move. Thus, it is possible to control a shift to be 3 μm/cos γ.

Moreover, an amount of change in defocus in the main scanning direction is controlled to be 0.2 and an amount of change in defocus in the sub-scanning direction is controlled to be equal to or smaller than 0.5 (see FIG. 25).

COMPARATIVE EXAMPLE

A comparative example for comparing the effects of the first example and the second example with the conventional optical beam scanning device will be explained. In this comparative example, the optical element 79 is not arranged in a pre-deflection optical system.

FIGS. 26 to 29 are examples of data tables that define a lens surface of an optical element in an optical system in which the optical element 79 is not arranged in a pre-deflection optical system.

As shown in FIG. 29, a RAY1 (a ray for Y) and a RAY4 (a ray for black) move in a direction in which an interval between the rays widens 90 μm at a temperature rise of 15 degrees. In the example of the combination of the members that define the housing and the photoconductive member interval and the material of the transfer belt driving shaft in the first example, the rays shift 90 μm with respect to the misregistration amount (32 μm/cos γ) of the case in which the rays do no move. Thus, a color superimposition shift of 58 μm/cos γ occurs between yellow and black at a temperature rise of 15 degrees.

Moreover, it is seen from FIG. 29 that amounts of change in defocus in the main scanning direction and the sub-scanning direction are also large compared with those in the first and second examples.

In this comparative example, when the same structure as the members that define the housing and the photoconductive member interval and the material of the transfer belt driving shaft in the second example is adopted, the rays shift in the same direction 90 μm in addition to a misregistration amount (30 μm/cos γ) of the case in which the rays do not move. Thus, a color superimposition shift as large as 120 μm/cosγ occurs between yellow and black at a temperature rise of 15 degrees.

As described above, it is seen from the respective examples that it is preferable that, in the optical element 79 on which the diffraction grating is formed, the plane of incidence is formed as a convex surface and the plane of exit is formed as a concave surface and a curvature radius of the plane of incidence is set larger than a curvature radius of the plane of exit. It is considered that, by forming the plane of incidence and the plane of exit of the optical element 79 in such shapes, it is possible to reduce angles of incidence on the optical element 79 and control refraction of rays made incident on the optical element 79 while moving closer to each other to control occurrence of an aberration on the plane of incidence.

It is possible to control a wave aberration on an image surface while correcting a beam position and defocus according to a temperature change (temperature compensation) by forming both the plane of incidence and the plane of exit as curved surfaces.

In the respective embodiments, the example in which the two fθ lenses are provided as the shared optical element is mainly explained. However, the invention is applicable to the optical system including one fθ lens shown in FIGS. 1 and 2 in various forms.

Figure 30:
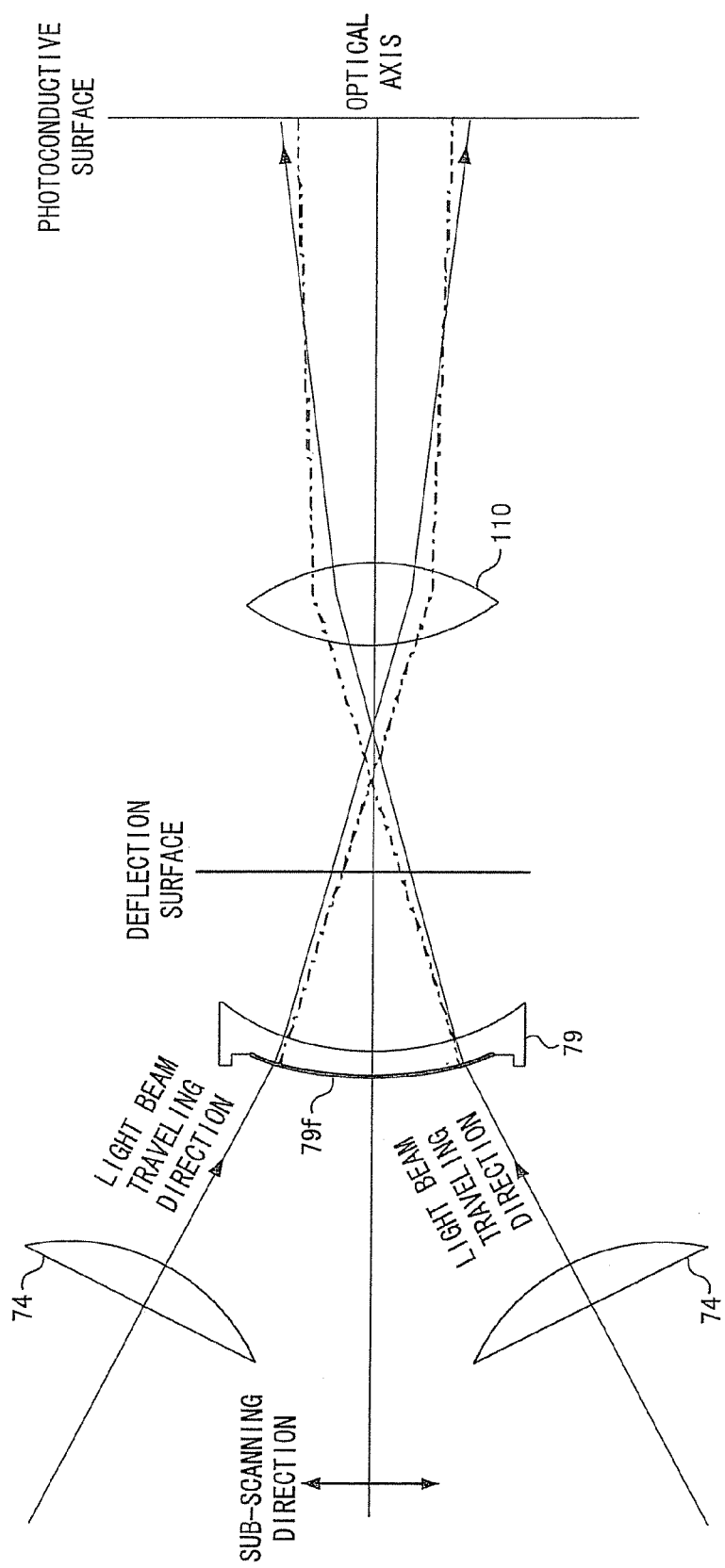
FIG. 30 is a diagram showing an example in which, in an optical beam scanning device including one fθ lens, a diffraction grating is formed on a plane of incidence 79f of the optical element 79.

FIG. 30 is a diagram showing an example in which, in the optical beam scanning device including one fθ lens, a diffraction grating is formed on the plane of incidence 79f of the optical element 79. By adopting a structure shown in the figure, it is possible to provide the optical beam scanning device that realizes effects same as those in the second example.

Figure 31:
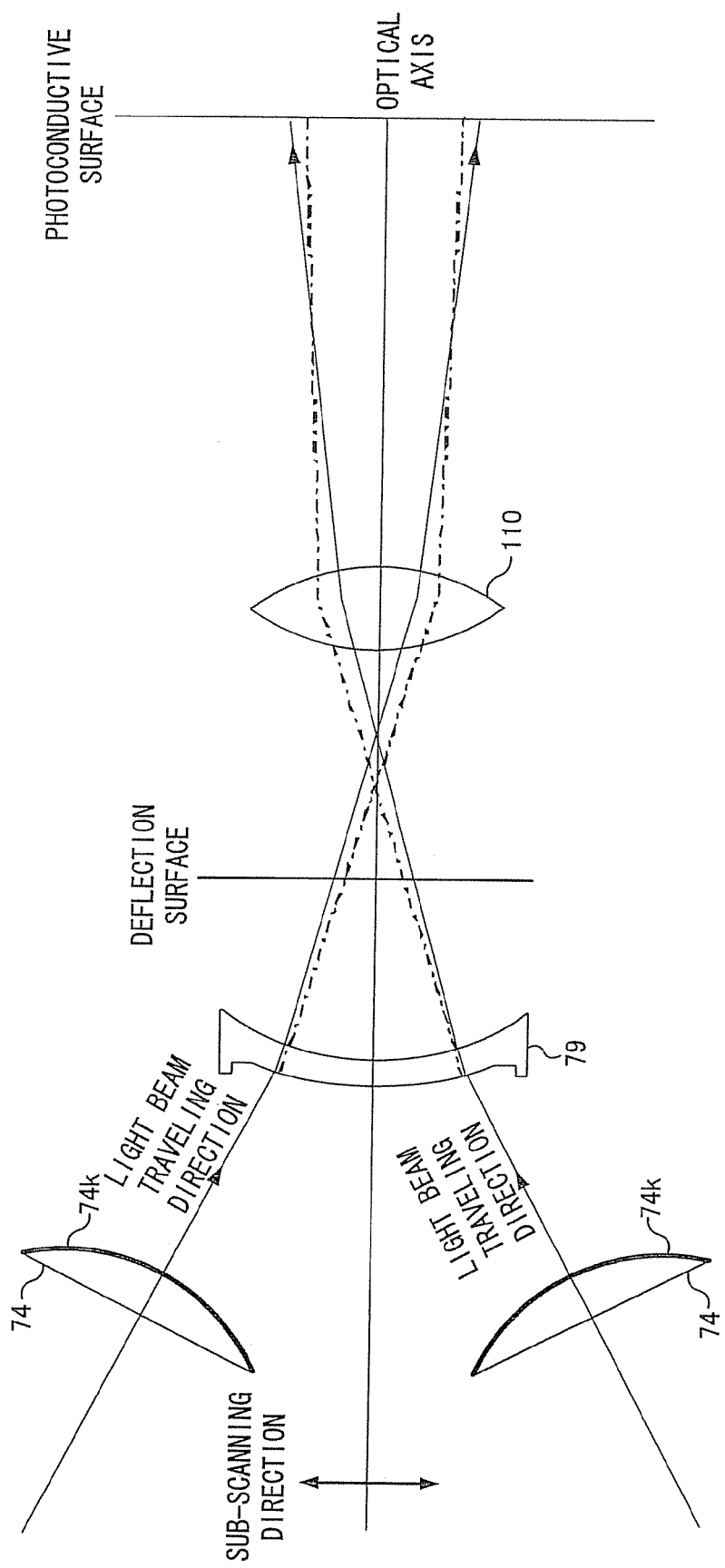
FIG. 31 is a diagram showing a structure in which, in the optical beam scanning device including one fθ lens, diffraction gratings are formed on planes of exit 74k of cylinder lenses 74.

FIG. 31 is a diagram showing a structure in which, in the optical beam scanning device including one fθ lens, diffraction gratings are formed on planes of exit 74k of the cylinder lenses 74 that condense light beams near the polygon mirror 80.

Figure 32:
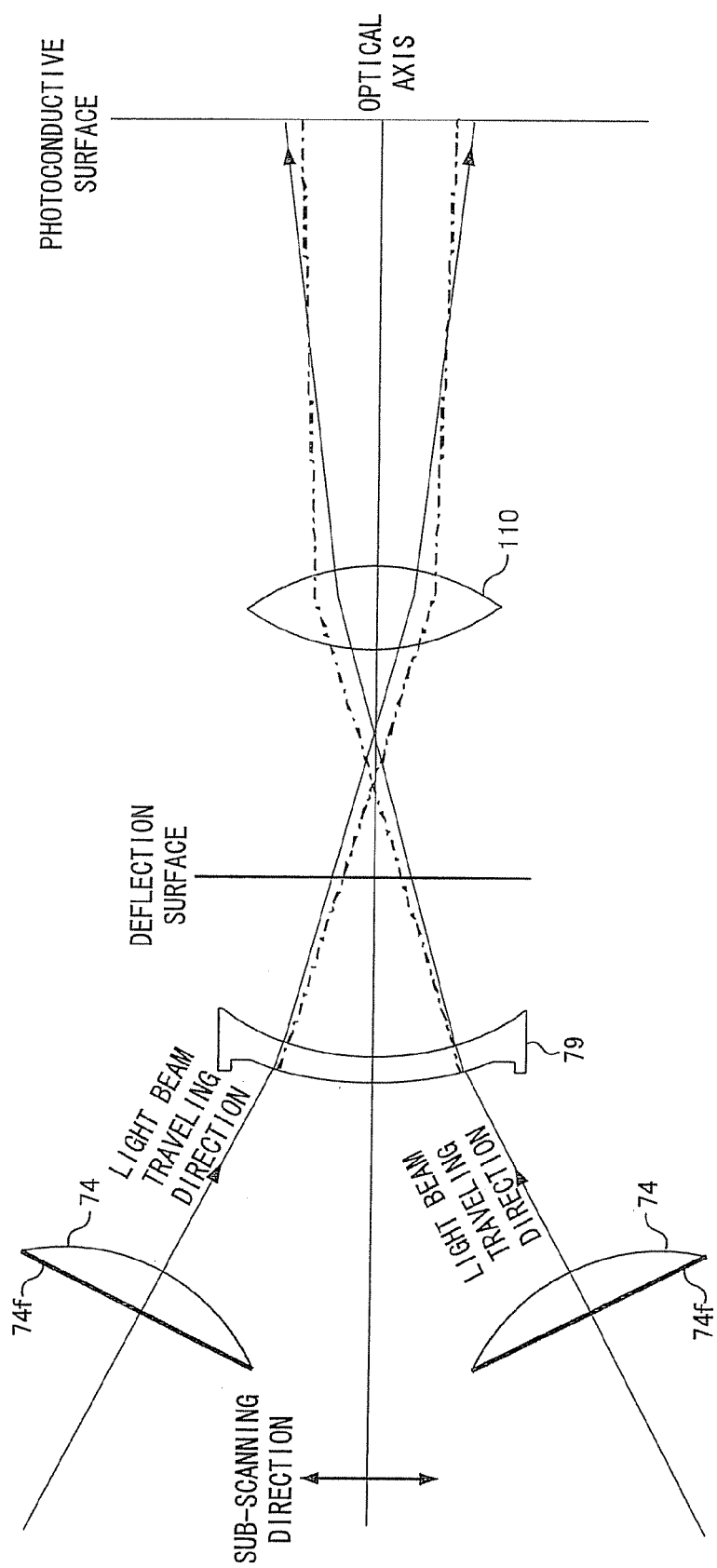
FIG. 32 is a diagram showing a structure in which, in the optical beam scanning device including one fθ lens, diffraction gratings are formed on planes of incidence 74f of the cylinder lenses 74.

FIG. 32 is a diagram showing a structure in which, in the optical beam scanning device including one fθ lens, diffraction gratings are formed on planes of incidence 74f of the cylinder lenses 74 that condense light beams near the polygon mirror 80. As shown in FIGS. 31 and 32, by adopting the structure in which the diffraction gratings are formed on the existing optical elements, the number of components of the optical elements is not increased and it is possible to contribute to a reduction in cost and saving of a space.

Figure 33:
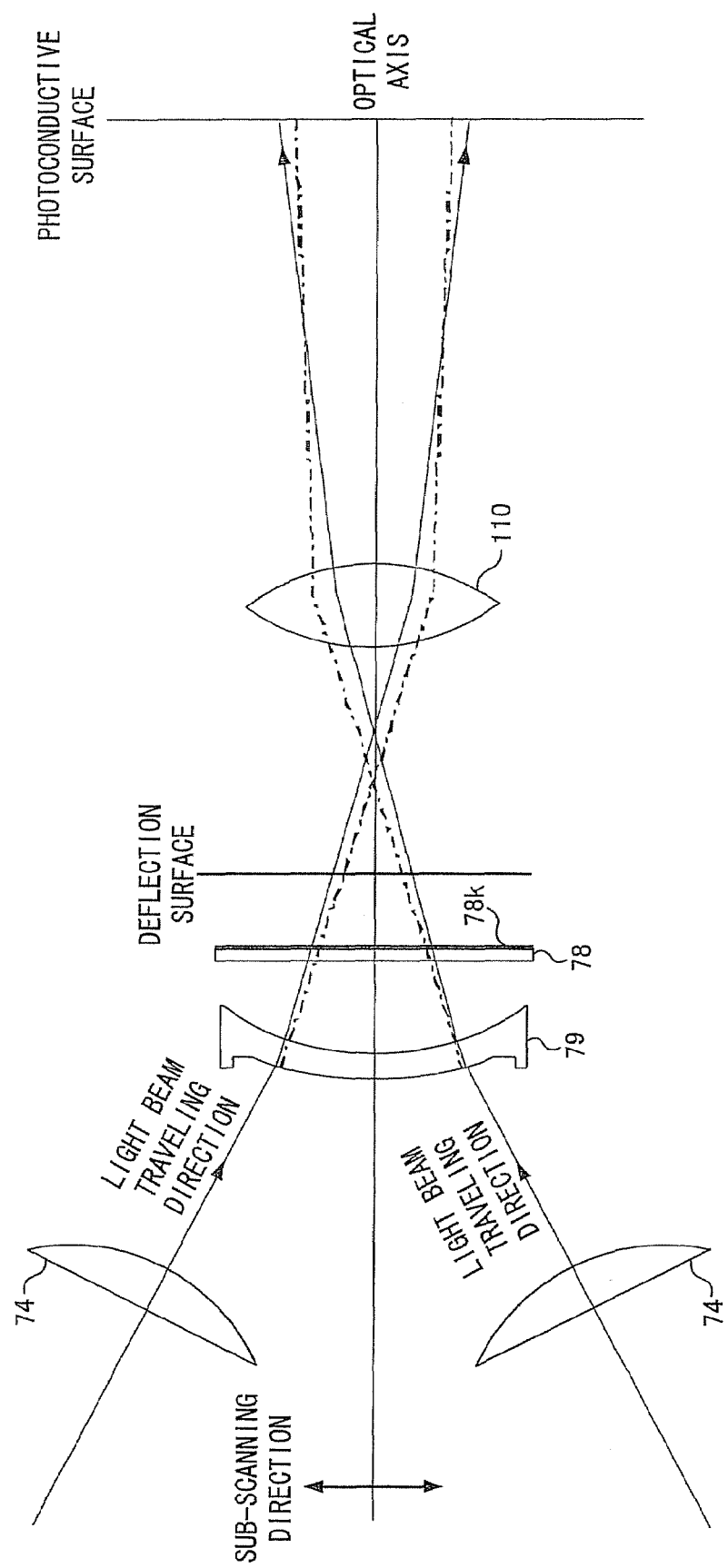
FIG. 33 is a diagram showing a structure in which, in the optical beam scanning device including one fθ lens, a tabular optical element 78 in which a diffraction grating is formed on planes of exit 78k is provided between the optical element 79 and a deflection surface.

FIG. 33 is a diagram showing a structure in which, in the optical beam scanning device including one fθ lens, a tabular optical element 78 in which a diffraction grating is formed on a plane of exit 78k is provided between the optical element 79 and the deflection surface in the pre-deflection optical system as the optical element having the diffraction grating formed therein.

Figure 34:
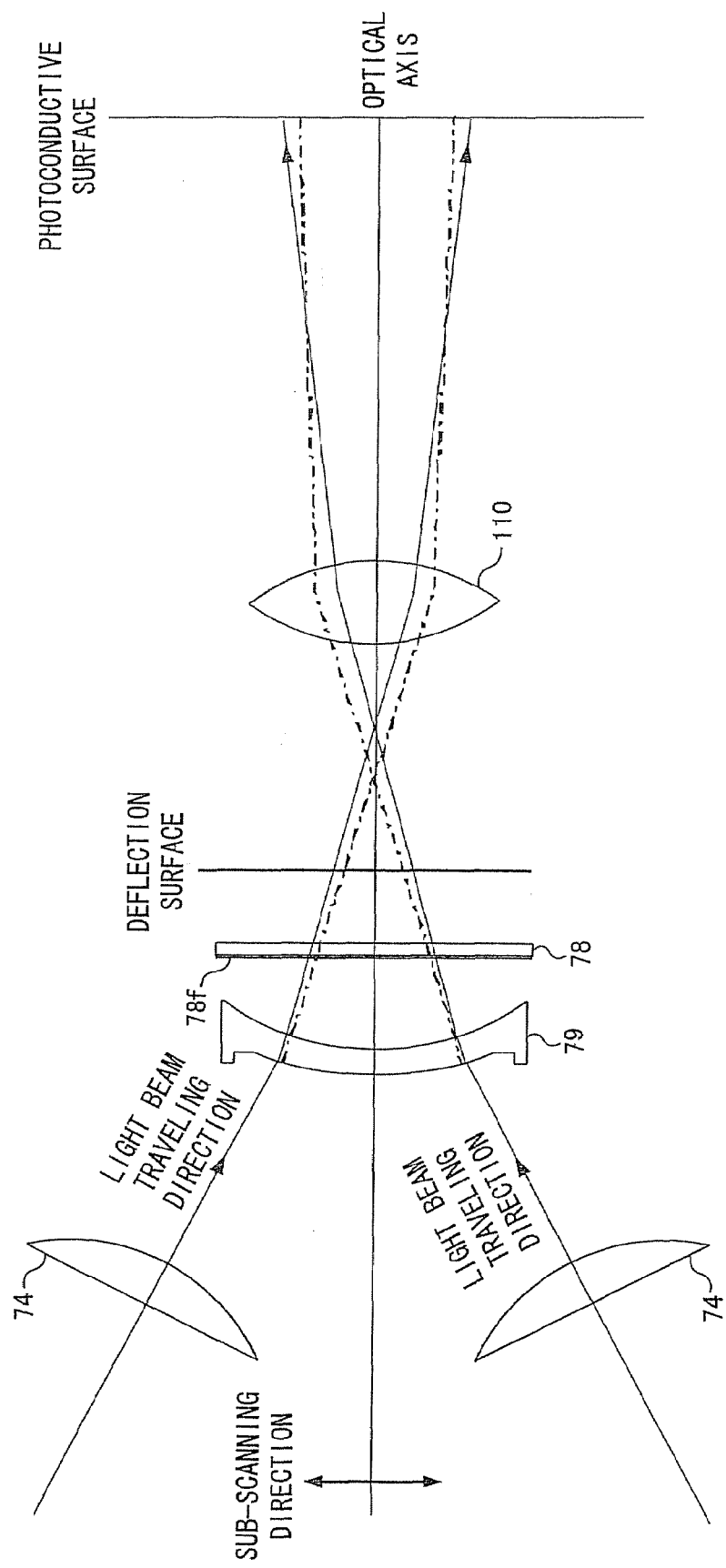
FIG. 34 is a diagram showing a structure in which, in the optical beam scanning device including one fθ lens, the tabular optical element 78 in which a diffraction grating is formed on a plane of incidence 78f is provided between the optical element 79 and the deflection surface.

FIG. 34 is a diagram showing a structure in which, in the optical beam scanning device including one fθ lens, the tabular optical element 78 in which a diffraction grating is formed on the plane of incidence 78f is provided between the optical element 79 and the deflection surface in the pre-deflection optical system as the optical element having the diffraction grating formed therein. As shown in FIGS. 33 and 34, by adopting the structure in which the tabular optical element having only power generated by the diffraction grating is independently provided, it is possible to adjust a distance between the diffraction grating and the optical element adjacent to the diffraction grating. Thus, it is possible to realize a more excellent optical characteristic while reducing a defocus amount compared with the case in which a diffraction grating is formed on the existing optical element.

Figure 35:
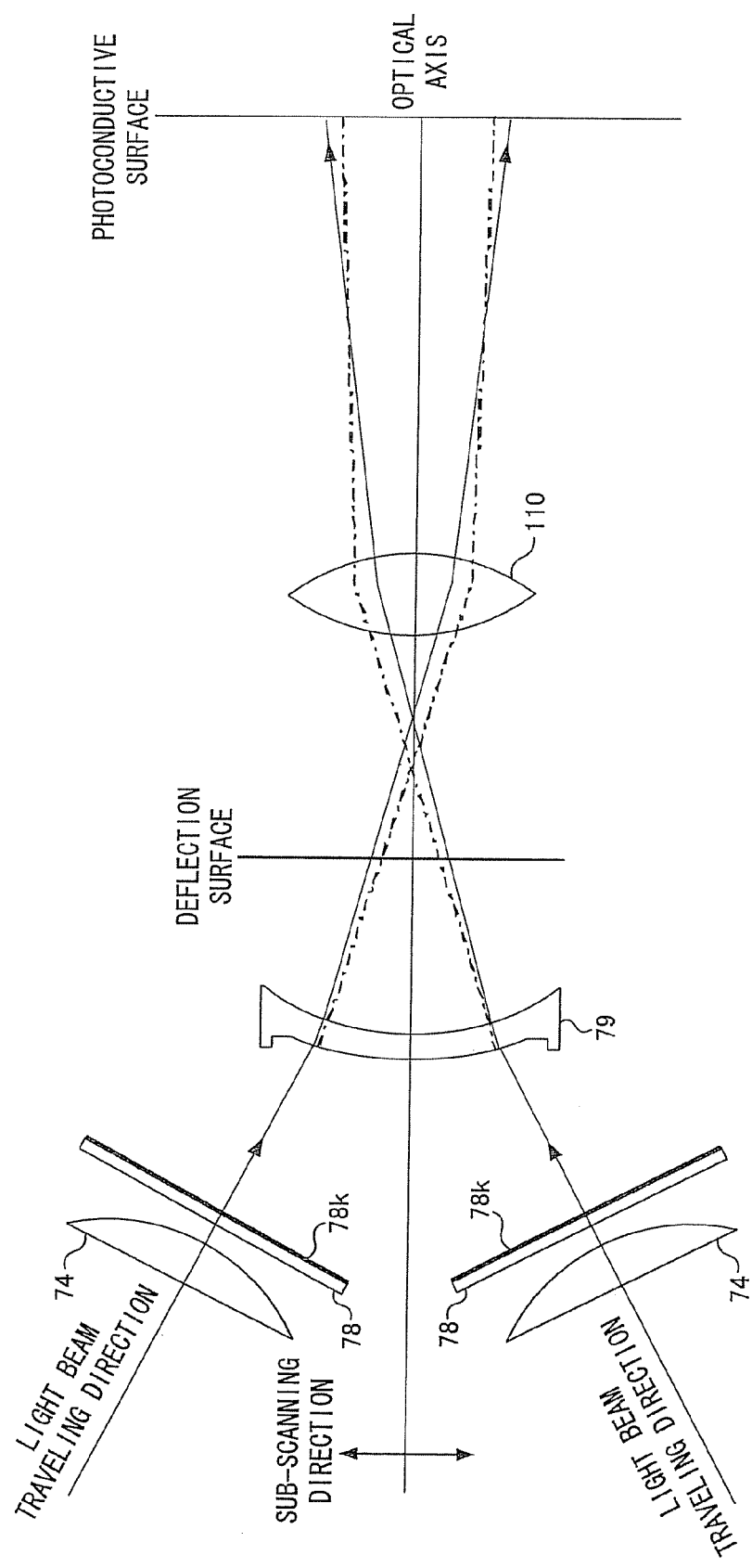
FIG. 35 is a diagram showing a structure in which, in the optical beam scanning device including one fθ lens, tabular optical elements 78 in which diffraction gratings are formed on planes of exit 78k are provided near a downstream side in light beam traveling directions of the cylinder lenses 74.

FIG. 35 is a diagram showing a structure in which, in the optical beam scanning device including one fθ lens, tabular optical elements 78 in which diffraction gratings are formed on planes of exit 78k are provided near the downstream side in light beam traveling directions of the cylinder lenses 74 that condense light beams near the polygon mirror 80.

Figure 36:
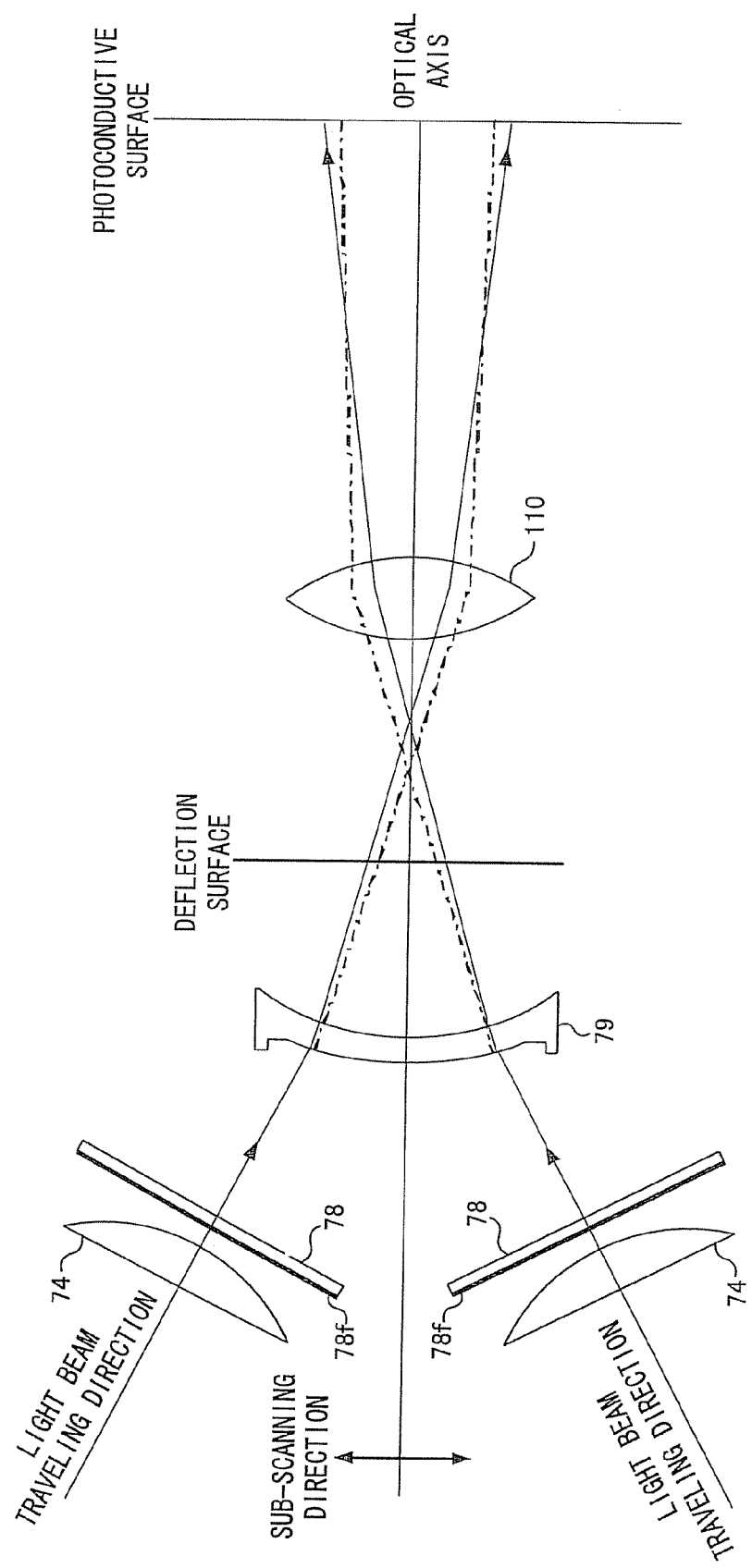
FIG. 36 is a diagram showing a structure in which, in the optical beam scanning device including one fθ lens, the tabular optical elements 78 in which the diffraction gratings are formed on the planes of incidence 78f are provided near the downstream side in the light beam traveling directions of the cylinder lenses 74.

FIG. 36 is a diagram showing a structure in which, in the optical beam scanning device including one fθ lens, the tabular optical elements 78 in which the diffraction gratings are formed on the planes of incidence 78f are provided near the downstream side in the light beam traveling directions of the cylinder lenses 74 that condense light beams near the polygon mirror 80. In this way, without limitation to the structure in which a diffraction surface is provided in a lens through which all rays pass, it is possible to realize the same effects by causing lenses having diffraction surfaces individually to act on respective rays and shifting optical axes of the lenses having the diffraction surfaces with respect to the rays.

Figure 37:
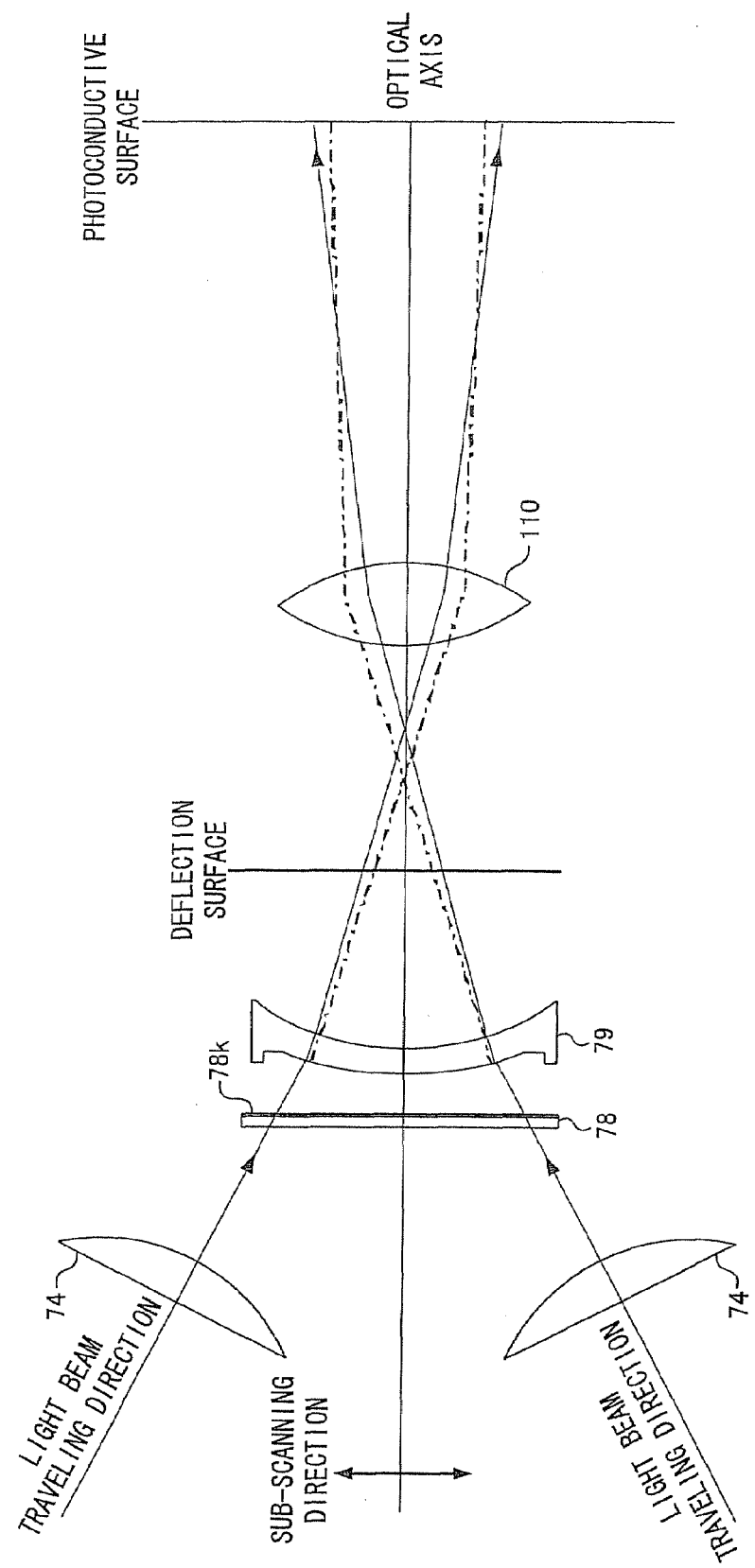
FIG. 37 is a diagram showing a structure in which, in the optical beam scanning device including one fθ lens, the tabular optical element 78 in which the diffraction grating is formed on the plane of exit 78k is provided between the cylinder lens 74 and the optical element 79.

FIG. 37 is a diagram showing a structure in which, in the optical beam scanning device including one fθ lens, the tabular optical element 78 in which the diffraction grating is formed on the plane of exit 78k is provided between the cylinder lens 74 and the optical element 79 in the pre-deflection optical system as the optical element having the diffraction grating formed therein.

Figure 38:
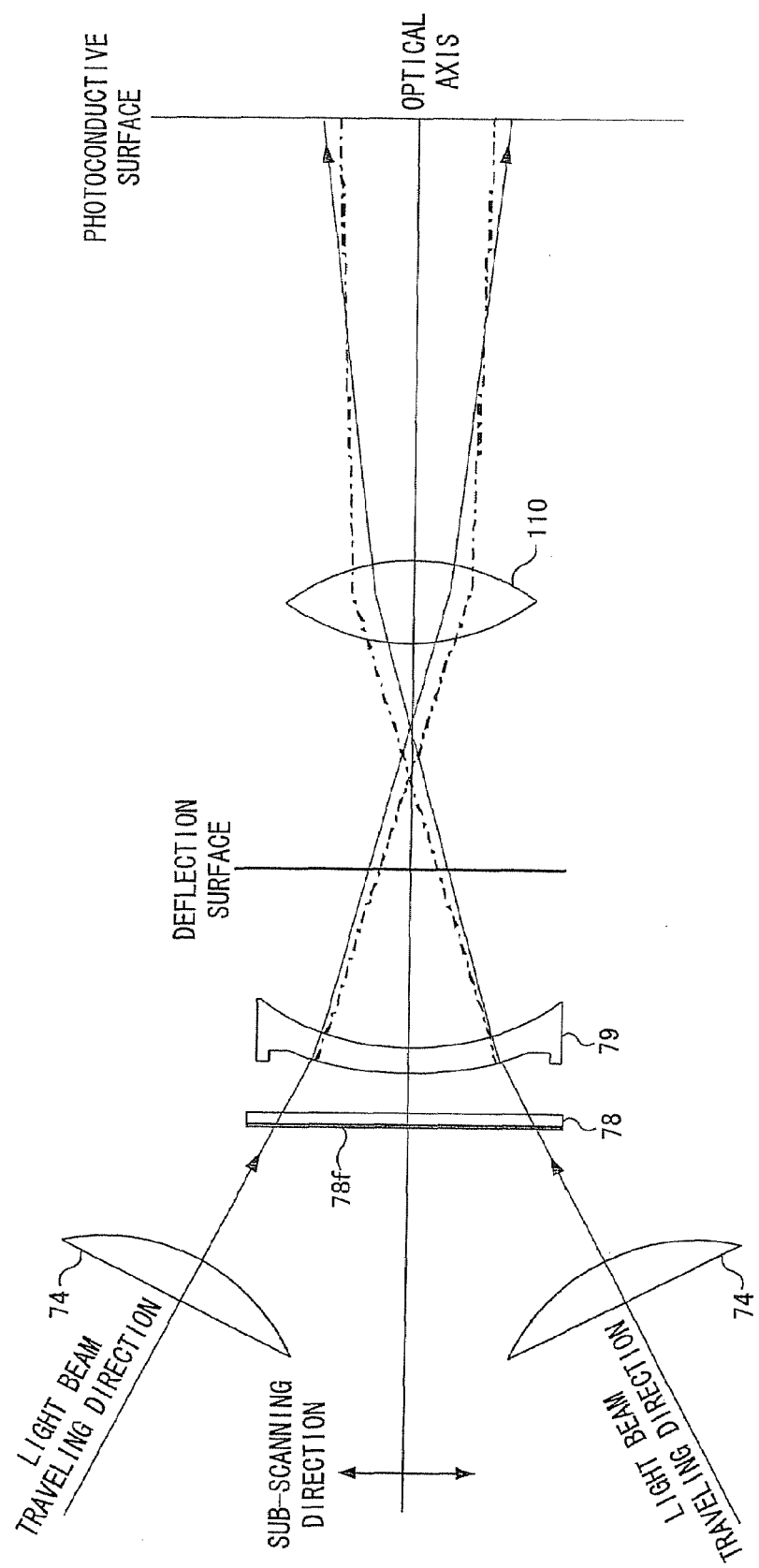
FIG. 38 is a diagram showing a structure in which, in the optical beam scanning device including one fθ lens, the tabular optical element 78 in which the diffraction grating is formed on the plane of incidence 78f is provided between the cylinder lens 74 and the optical element 79.

FIG. 38 is a diagram showing a structure in which, in the optical beam scanning device including one fθ lens, the tabular optical element 78 in which the diffraction grating is formed on the plane of incidence 78f is provided between the cylinder lens 74 and the optical element 79 in the pre-deflection optical system as the optical element having the diffraction grating formed therein.

In the examples shown in FIGS. 30 to 38, examples of application to the optical beam scanning device including one fθ lens are described. However, it goes without saying that the structures shown in FIGS. 30 to 38 are also applicable to the optical beam scanning device including two fθ lenses (see FIGS. 3 and 4).

In the embodiment described above, the structure in which one optical element having the diffraction grating formed therein is arranged for one optical path of a light beam is described as an example. However, the invention is not limited to this. For example, two optical elements having diffraction gratings formed therein are arranged on an optical path and a diffraction grating having power in the main scanning direction and a diffraction grating having power in the sub-scanning direction are separately formed in the two optical elements. This makes it possible to improve a degree of freedom of adjustment by the diffraction gratings and contribute to improvement of optical performance as well.

In a scanning optical system in which four optical units are arrayed individually, as described in the examples, it is also possible to cause the scanning optical system to display the same effects by guiding light beams through the optical paths of the RAY1, the RAY2, the RAY3, and the RAY 4 in the respective scanning optical systems.

Moreover, in an optical system unit that guides two rays to two surfaces with different angular positions of one polygon mirror from different directions and causes reflected light reflected on a deflection surface on which these rays are made incident to scan in directions different from each other, as described in the examples, it is possible to realize the same effects if optical paths of the respective rays pass the same optical paths as the RAY1 and the RAY2.

The invention has been explained in detail according to the specific forms. However, it would be obvious for those skilled in the art that various modifications and alterations could be made without departing from the spirit and the scope of the invention.

As described in detail above, according to the invention, it is possible to provide a technique that can appropriately correct an optical characteristic according to fluctuation in an environmental temperature.

What is claimed is:

1. An optical beam scanning device that shapes a diverging ray from a light source to be a light beam having a predetermined sectional shape in a pre-deflection optical system including plural optical elements and deflects the light beam shaped by the pre-deflection optical system with a rotating deflector to cause the light beam to scan in a main scanning direction, wherein the pre-deflection optical system has optical elements arranged between the light source and reflecting surfaces of the rotating deflector in a light beam traveling direction and having negative power, among the plural optical elements forming the pre-deflection optical system, in at least one optical element in which a principal ray of the light beam from the light source is made incident on a position of incidence different from an optical path of an optical axis of the pre-deflection optical system in a sub-scanning direction orthogonal to the main scanning direction, a diffraction grating is formed on at least one of a plane of beam incidence and a plane of beam exit in the optical element, and the optical element having the diffraction grating formed therein has a plane of incidence formed as a convex surface and a plane of exit formed as a concave surface.

2. An optical beam scanning device that shapes a diverging ray from a light source to be a light beam having a predetermined sectional shape in a pre-deflection optical system including plural optical elements and deflects the light beam shaped by the pre-deflection optical system with a rotating deflector to cause the light beam to scan in a main scanning direction, wherein the pre-deflection optical system has optical elements arranged between the light source and reflecting surfaces of the rotating deflector in a light beam traveling direction and having negative power, among the plural optical elements forming the pre-deflection optical system, in at least one optical element in which a principal ray of the light beam from the light source is made incident on a position of incidence different from an optical path of an optical axis of the pre-deflection optical system in a sub-scanning direction orthogonal to the main scanning direction, a diffraction grating is formed on at least one of a plane of beam incidence and a plane of beam exit in the optical element, and the optical element having the diffraction grating formed therein has a curvature radius of a plane of incidence set larger than a curvature radius of a plane of exit.

3. An optical beam scanning device that shapes respective diverging rays from plural light sources to be light beams having a predetermined sectional shape in a pre-deflection optical system including plural optical elements and deflects the light beams shaped by the pre-deflection optical system with a rotating deflector to cause the light beams to scan in a main scanning direction, wherein the pre-deflection optical system has optical elements arranged between the light source and reflecting surfaces of the rotating deflector in a light beam traveling direction and having negative power acting on all light beams, among the plural optical elements forming the pre-deflection optical system, in at least one optical element in which principal rays of respective light beams from the plural light sources are made incident on positions of incidence different from each other in a sub-scanning direction orthogonal to the main scanning direction, a diffraction grating is formed on at least one of a plane of beam incidence and a plane of beam exit in the optical element, and the optical element having the diffraction grating formed thereon has a plane of incidence formed as a convex surface and a plane of exit formed as a concave surface.

4. An optical beam scanning device that shapes respective diverging rays from plural light sources to be light beams having a predetermined sectional shape in a pre-deflection optical system including plural optical elements and deflects the light beams shaped by the pre-deflection optical system with a rotating deflector to cause the light beams to scan in a main scanning direction, wherein the pre-deflection optical system has optical elements arranged between the light source and reflecting surfaces of the rotating deflector in a light beam traveling direction and having negative power acting on all light beams, among the plural optical elements forming the pre-deflection optical system, in at least one optical element in which principal rays of respective light beams from the plural light sources are made incident on positions of incidence different from each other in a sub-scanning direction orthogonal to the main scanning direction, a diffraction grating is formed on at least one of a plane of beam incidence and a plane of beam exit in the optical element, and the optical element having the diffraction grating formed thereon has a curvature radius of a plane of incidence set larger than a curvature radius of a plane of exit.

5. An optical beam scanning device that shapes respective diverging rays from plural light sources to be light beams having a predetermined sectional shape in a pre-deflection optical system including plural optical elements and deflects the light beams shaped by the pre-deflection optical system with a rotating deflector to cause the light beams to scan in a main scanning direction;

a photoconductive member on which an electrostatic latent image is formed by a light beam caused to scan by the optical beam scanning device; and a developing unit configured to visualize the electrostatic latent image formed on the photoconductive member; wherein the pre-deflection optical system has optical elements arranged between the light source and reflecting surfaces of the rotating deflector in a light beam traveling direction and having negative power acting on all light beams, among the plural optical elements forming the pre-deflection optical system, in at least one optical element in which principal rays of respective light beams from the plural light sources are made incident on positions of incidence different from each other in a sub-scanning direction orthogonal to the main scanning direction, a diffraction grating is formed on at least one of a plane of beam incidence and a plane of beam exit in the optical element, the plural photoconductive member transfers a developing agent image visualized by the developing unit to a belt, and plural optical elements forming the optical beam scanning device are set in an optical characteristics that, when a linear expansion coefficient of a material of a housing that supports the plural optical elements is set as $\alpha_H$, a linear expansion coefficient of a member that defines intervals among plural photoconductive members is set as $\alpha_F$, a linear expansion coefficient of a material of a shaft that drives the belt is set as $\alpha_S$, an interval between two rays located at both ends in plural photoconductive members arrayed along the belt is set as L, an inter-beam interval in a sub-scanning direction of light beams, which should be guided to the respective two photoconductive members, is set as LB, and a rising temperature is set as t, an amount of change in the inter-beam interval LB is $-(\alpha_H - 2 \times \alpha_F + \alpha_S) \times (L \times t) + \alpha_H \times LB \times t$.

* * * * *